United States Patent
Mondiere et al.

(10) Patent No.: US 9,637,645 B2
(45) Date of Patent: May 2, 2017

(54) ITEM HAVING ANTI-SOILING PROPERTIES AND INTENDED FOR AQUATIC AND PARTICULARLY OCEAN USE

(71) Applicant: BLUESTAR SILICONES FRANCE SAS, Lyons (FR)

(72) Inventors: Aurélie Mondiere, Lyons (FR); Tania Ireland, Cessieu (FR); Anne Seggio, Lyons (FR)

(73) Assignee: BLUESTAR SILICONES FRANCE SAS (FR)

( * ) Notice: Subject to any disclaimer, the term of this patent is extended or adjusted under 35 U.S.C. 154(b) by 0 days.

(21) Appl. No.: 15/100,011

(22) PCT Filed: Dec. 2, 2014

(86) PCT No.: PCT/FR2014/000257
§ 371 (c)(1),
(2) Date: May 27, 2016

(87) PCT Pub. No.: WO2015/082780
PCT Pub. Date: Jun. 11, 2015

(65) Prior Publication Data
US 2017/0009086 A1    Jan. 12, 2017

(30) Foreign Application Priority Data
Dec. 3, 2013 (FR) ...................... 13 02812

(51) Int. Cl.
*C09D 5/08* (2006.01)
*C09D 5/16* (2006.01)
*C08G 77/08* (2006.01)

(52) U.S. Cl.
CPC ........... *C09D 5/1693* (2013.01); *C08G 77/08* (2013.01); *C09D 5/1687* (2013.01)

(58) Field of Classification Search
None
See application file for complete search history.

(56) References Cited

U.S. PATENT DOCUMENTS

| 3,702,778 A | 11/1972 | Mueller et al. |
| 4,025,693 A | 5/1977 | Milne |
| 4,515,932 A | 5/1985 | Chung |
| 4,528,353 A | 7/1985 | Lucas et al. |
| 4,563,498 A | 1/1986 | Lucas |
| 5,519,104 A | 5/1996 | Lucas |
| 7,847,401 B2 | 12/2010 | Chidambaram et al. |
| 9,139,699 B2 * | 9/2015 | Cook .................. B01J 31/2217 |

FOREIGN PATENT DOCUMENTS

| EP | 051930 | 5/1982 |
| EP | 0885933 A1 | 12/1998 |
| EP | 0885938 A2 | 12/1998 |
| EP | 2147957 A1 | 1/2010 |
| FR | 2083029 A5 | 12/1971 |
| FR | 2266733 A1 | 10/1975 |
| FR | 2375305 A1 | 7/1978 |
| FR | 2557585 A1 | 7/1985 |
| FR | 2856694 A1 | 12/2004 |
| GB | 2118196 A | 10/1983 |

OTHER PUBLICATIONS

International Search Report dated May 8, 2015, issued in PCT/FR2014/000257, English Translation thereof.

* cited by examiner

*Primary Examiner* — Robert S Loewe
(74) *Attorney, Agent, or Firm* — McBee Moore Woodward & Vanik IP, LLC

(57) ABSTRACT

The present invention relates to an item having anti-soiling properties and intended for aquatic, and particularly ocean use, and to a method for slowing the growth of aquatic organisms on submersible or semi-submersible structures.

10 Claims, No Drawings

ITEM HAVING ANTI-SOILING PROPERTIES AND INTENDED FOR AQUATIC AND PARTICULARLY OCEAN USE

CROSS REFERENCE TO RELATED APPLICATIONS

This application is a §371 National Stage Application of PCT/FR2014/000257, filed 2 Dec. 2014, which claims priority to FR 13/02812, filed Dec. 3, 2013.

BACKGROUND

Field of the Invention

The present invention relates to an article with antifouling properties for use in aquatic applications, in particular marine applications, and also to a process for retarding the growth of aquatic organisms on submersible or semi-submersible structures.

The invention relates to the field of antifouling marine paints. Antifouling marine paints are top coats for preventing the attachment of animals or plants to ship hulls. They are used for safety reasons, for maintaining the maneuverability of ships, for reducing the consumption of fuel, and for combating corrosion and the emburdening of structures.

Description of Related Art

The problem of "biofouling" is a major problem resulting from the submersion of materials into marine environments. A considerable maintenance cost is involved in preventing this phenomenon.

Specifically, the formation of "biofouling" or "fouling" takes place during submersion in seawater, in which a layer of organic and mineral molecules is adsorbed onto the surface of the material extremely rapidly. This layer of adsorbed material or "biofilm" serves as a mediator for the adhesion of the bacteria present in suspension in the marine environment.

This surface colonization by marine bacteria is rapid and a stationary state is reached after a period of a few hours to a few days. Finally, other marine organisms come to colonize the surface, the adherent bacteria recruiting these other organisms. This set of live organisms connected to the surface constitutes the "biofouling" or "fouling".

The adhesion of marine fouling concerns any structure submerged in the sea: ships, pipelines, cooling towers and circuits, port structures, marine sensors, aquaculture systems, etc. Diverse and extensive damage is thereby caused. Specifically, these structures become encrusted, for example, with organisms that have a negative effect on the performance qualities of the structures.

In particular, for ship hulls, the encrustation of various marine organisms increases the friction between the ship hulls and the seawater, which reduces the speed and may lead to greater fuel consumption. Thus, the bottom of a ship that is not protected with an antifouling system may, after less than six months spent at sea, be covered with 150 kg of fouling per square meter.

To avoid this economic loss, and also to better inhibit corrosion, paints known as antifouling paints are applied to the submerged parts of structures exposed to water, the purpose of these paints being to prevent or to notably reduce the encrustation fouling of marine organisms. The principle of antifouling paints is based on the controlled release of an active substance at the interface between the surface and the seawater. The efficacy of the paint is maintained as long as the concentration of active substance released at the surface is efficient and regular. The majority of antifouling paints thus contain a biocidal product, which is usually an organometallic compound (based on tin, copper or zinc) or an organic compound (fungicide, algicide or bactericide) which prevents the adhesion of marine fouling via their toxic activity.

However, the problem associated with the use of these paints is that they release into the marine environment substances that are harmful to marine fauna and flora. Furthermore, the coatings become increasingly coarse by gradually degrading, which increases the fuel consumption and augments the hydrodynamic noise emitted by the submerged structure.

This novel difficulty has been solved by using self-cleaning antifouling paints. In addition to containing biocidal agents, these paints have, under the action of surface hydrolysis by seawater and that of erosion due to the movement of the ship, a regular and controlled loss of thickness over time. The slow erosion of the coating on contact with seawater allows the surface to be constantly renewed with biocidal agents.

The self-cleaning antifouling paints developed since the 1960s were based on tin salts. These are self-cleaning paints formulated with tributyltin (TBT) methacrylate copolymers which have a constant degree of leaching. The TBT grafted onto an acrylic binder is released slowly by hydrolysis in water. Examples of this type of paint are described in documents FR-A-2 266 733, FR-A-2 557 585, EP-A-0 051 930 and GB-A-2 118 196.

Tributyltin (TBT), which is very efficient, was thus the biocide most commonly used in antifouling paints, but this product, its degradation molecules and its metabolites have proven to be seriously and durably polluting. For these reasons, the International Maritime Organization has banned the use of tin-based antifouling paints.

The antifouling paints now used are mainly based on copper compounds and/or synthetic chemical compounds, but also based on polymers of silicone type.

For the copper-based paints, although they are less toxic than tin salts, they are virtually always formulated with a large proportion of cuprous oxide (see, for example, document EP-A-051 930 or FR-A-2 557 585), the main binder being based on special polymers generally of acrylic type. However, they are only effective against marine fauna, and, to combat the growth of algae, it is essential to add herbicides, which may place new threats on the environment.

This alternative therefore does not provide a durable solution for protecting the environment from the massive discharge of heavy ions, especially copper ions, following the intensive use of tin-free but copper-rich paints.

Another solution for preventing the fouling of the surfaces of structures in contact with seawater consists in covering these surfaces with at least one protective coating, the outer coat of the coating in contact with the water being a silicone elastomer. These coatings are prepared from paints known as "fouling-release coating" paints. The principle of these novel antifouling paints is to create a very smooth surface with a low surface energy, to which organisms have great difficulty in adhering. When such surfaces are stationary, marine organisms can be deposited thereon. However, by virtue of the suppleness and the low surface tension of the silicone-based top coat, these organisms are simply removed by the force of the movement of water or the effect of friction caused by the movement of the ship. This also means that if there is sufficient movement of water about the hull of a ship, a natural self-cleaning effect takes place.

By virtue of these properties, even ships that are less frequently at sea or in waters with less movement benefit from more spaced apart cleaning intervals. This is due to the fact that marine organisms have difficulty in adhering to the surface, which also makes the cleaning easier.

These silicone-based paints forming an antifouling coating are thus very innovative:
  they are totally friendly to the marine environment: no discharge of metals, and
  they improve the slippage of ships, thus reducing their fuel consumption by 1% to 5% and thus their emissions of greenhouse gases.

Many patents, for example patents FR-A-2 083 029 and U.S. Pat. No. 3,702,778, describe such coatings whose final coat, known as the "top coat", is made of hot-cured or cold-cured silicone elastomer.

For example, patent application U.S. Ser. No. 07/847,401, filed on Mar. 6, 1992, discloses an antifouling system containing three components, comprising at least one coat of an epoxy primer, an adhesion primer or fixing coat (tie coat) and an antifouling coat (top coat) based on silicone elastomer. The final coat of epoxy primer is normally a thin coat that is applied to obtain a clean and fresh surface onto which the tie coat can adhere. The tie coat comprises an organopolysiloxane and a curing constituent. The antifouling coat comprises an organopolysiloxane, an alkyl silicate and a curing agent or a separate tin-based catalyst. The coat(s) of epoxy primer are applied directly onto the support. The tie coat is applied onto the coat(s) of epoxy primer. The antifouling coat of silicone coating is then applied and crosslinked on the tie coat, after partial curing of the latter.

An antifouling coat (top coat) based on silicone elastomer may also comprise fluids that improve the "antifouling" effect, in particular:
  methylphenylpolysiloxane oils (U.S. Pat. No. 4,025,693),
  a hydrocarbon-based liquid compound, for example a polyolefin,
  a plasticizer,
  a lubricant oil (FR-A-2 375 305),
  liquid paraffins and waxy masses such as petrolatum (JP-A-83/013 673),
  a thermoplastic polymer such as PVC,
  a vinyl chloride/vinyl acetate copolymer (Kokai JP-A-79/026 826), or
  cationic, anionic, nonionic or amphoteric surfactants (JP-A-85/258 271).

In order to form the silicone elastomer coating, the silicone formulations used generally involve a silicone oil, generally a reactive polydimethylsiloxane bearing hydroxyl end groups, optionally prefunctionalized with a silane so as to have alkoxy end groups, a crosslinking agent and a polycondensation catalyst, conventionally a tin salt or an alkyl titanate, a reinforcing filler and other optional additives such as packing fillers, adhesion promoters, colorants, etc.

These silicone compositions which "cure" by polymerization and/or crosslinking at room temperature (which may vary depending on the region between 5° and 30° C.) are well known to those skilled in the art and are classified into two distinct groups:
  compositions packaged in the form of a "one-pack system" (RTV-1), which are in the form of a single part (or pack) whose packaging is airtight, and
  compositions packaged in the form of a "two-pack system" (RTV-2) which are in the form of two separate parts (hence the name "two-pack") and whose packaging containing the catalyst is airtight.

The term "RTV" is the abbreviation for "room-temperature vulcanizing" The purpose of the airtight packagings is to prevent the silicone compositions containing the catalyst from coming into contact with atmospheric moisture during storage before use. During curing (by polymerization and/or crosslinking) of these silicone compositions, water is provided by the atmospheric moisture in the case of RTV-1 products. In the case of RTV-2 products, dimethyltin dicarboxylates are commonly used as catalysts, but they may require the addition of an amount of water to one of the parts in order to activate the catalyst and to allow the polycondensation reaction when the contents of the two parts are mixed in ambient air so as to form the elastomeric network, which is reflected by curing of the composition.

For example, one-pack silicone compositions (RTV-1) crosslink without heating according to a mechanism involving a certain number of reactions which may be successive or simultaneous:
  1. a functionalization reaction which results from placing together a silicone oil bearing silanol functions, for example a hydroxy-terminated silicone oil, such as an α,ω-(hydroxydimethylsilyl)polydimethylsiloxane, with a crosslinking agent, such as a silane of $SiX_4$ type (for example a silicate) or a compound having the following function —$SiX_3$ with X usually being an alkoxy, acyloxy, amino, amido, enoxy, aminoxy, ketiminoxy or oxime function. These functions are well known to be reactive with silanol functions. The resulting product is usually referred to as a "functionalized oil". This reaction may be desired directly during the preparation of the composition (in situ functionalization) or optionally as a pre-step before the addition of the other packs of the composition. In this pre-step, it is common practice to use a functionalization catalyst, for instance lithium hydroxide or potassium hydroxide so as to give the one-pack composition good storage stability. To do this, a person skilled in the art may choose specific functionalization catalysts and will adjust the amount of reagents so as to be in molar excess of crosslinking agent relative to the silanol functions to be functionalized
  2. Crosslinking via hydrolysis of the functionalized oil, generally performed by means of water vapor which diffuses into the material from the surface exposed to the atmosphere, and condensation between the silanol groups formed and other residual reactive functions.

As regards compositions packaged in two-pack systems (RTV-2), a first pack (or part) comprising the polymers that are liable to polycondense and the second pack is airtight and contains the catalyst and usually one or more crosslinking agents. The two packs (or parts) are mixed during use and the mixture cures (via crosslinking reactions) in the form of a relatively hard elastomer especially when the composition comprises reinforcing fillers. These compositions packaged in two-pack systems are well known and are described, in particular, in the book by Walter Noll "Chemistry and Technology of Silicones" 1968, 2nd Edition, on pages 395 to 398. These compositions usually comprise the following ingredients:
  a reactive polydiorganosiloxane with silanol groups at the end of the chain (for example an α,ω-bis(hydroxydimethylsilyl)polydimethylsiloxane), in the chain or at the end of the chain and in the chain,
  a crosslinking agent,
  a condensation catalyst, and
  optionally water, often present when a dialkyltin dicarboxylate is used as catalyst (activation of this catalyst by the presence of water).

Usually, the condensation catalyst is based on an organic tin compound. Indeed, many tin-based catalysts have already been proposed as a catalyst for crosslinking these RTV-1 or RTV-2 products. Conventional polycondensation catalysts comprise dialkyltin compounds, especially dialkyltin dicarboxylates such as dibutyltin dilaurate and diacetate, alkyl titanate compounds such as tetrabutyl or tetraisopropyl titanate, or titanium chelates (EP-A-0 885 933, U.S. Pat. No. 5,519,104, U.S. Pat. No. 4,515,932, U.S. Pat. No. 4,563,498 and U.S. Pat. No. 4,528,353).

However, the alkyltin-based catalysts, although very effective, usually colorless, liquid and soluble in silicone oils, have the drawback of being toxic (CMR2 toxic to reproduction).

For a durable development, it thus appears necessary to develop novel antifouling paints not comprising any toxic catalyst.

For example, an important characteristic of a curable silicone composition is the working time (pot life or working time), i.e. the time for which the composition can be used after mixing without curing. This time should be long enough to allow its use, but short enough to obtain a hard coating. For example, for a coating of tie coat or top coat type, a working time of between 2 and 4 hours is generally required when the exterior temperature is between 20 and 30° C. Outside this range, one of the means for adjusting this working time is the nature of the components used such as the catalyst; novel strategies for combating the adhesion of aquatic fouling and in particular marine fouling are now being developed.

SUMMARY

The aim of the invention is to propose an article that has antifouling properties by means of coatings obtained from antifouling paints not comprising any banned components (biocide or catalyst) and not containing any tin.

The present invention thus relates to an article with antifouling properties which is intended to be used in aquatic applications, in particular marine applications, comprising:
a) a support (1),
b) at least one adhesion-promoting coat (3) deposited on said support (1), and
c) at least one antifouling coat (4) deposited on said adhesion-promoting coat (3), said article being characterized in that said antifouling coat (4) is obtained after deposition and curing on contact with atmospheric moisture of a composition X comprising:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst C which is a heterometallic complex whose chemical formula comprises:
at least two different metal atoms M and M', M being an atom chosen from the group constituted by the atoms of columns 2 and 13 of the Periodic Table of the Elements and M' being an atom chosen from the group constituted by the atoms of column 4 of the Periodic Table of the Elements, and
at least one alkoxide ligand or chelating ligand.

To achieve this objective, the Applicant has, to its credit, demonstrated, entirely surprisingly and unexpectedly, that a polycondensation catalyst C, which is a heterometallic complex, makes it possible to prepare antifouling coats or coatings that are useful as tie coat or top coat in antifouling applications. The coats or coatings obtained according to the invention have noteworthy adhesion properties on the supports thus treated, while at the same time giving a very smooth treated surface, with a low surface energy, to which organisms have great difficulty in adhering.

DETAILED DESCRIPTION OF A PREFERRED EMBODIMENT

The catalysts according to the invention are used in the silicone systems to be crosslinked in very low contents, and make it possible, depending on the content, to adapt the working times to the application while at the same time ensuring excellent hardnesses of the elastomers obtained. The catalyst according to the invention may be in the solid or liquid state. It may be incorporated alone or in a suitable solvent. When it is in solvent, a silicone oil may be added; the solvent is then evaporated so as to transfer the catalyst into a silicone medium. The mixture obtained acts as a catalyzing base.

Said compound C is a heterometallic complex whose chemical formula comprises:
at least two different metal atoms M and M', M being an atom chosen from the group constituted by the atoms from columns 2 and 13 of the Periodic Table of the Elements and M' being an atom chosen from the group constituted by the atoms from column 4 of the Periodic Table of the Elements, and
at least one alkoxide ligand or chelating ligand.

According to a preferred embodiment, compound C is a heterometallic complex whose chemical formula comprises:
at least two different metal atoms M and M', M being a magnesium (Mg) or aluminum (Al) atom, preferably an aluminum (Al) atom, and M' being a titanium (Ti) or zirconium (Zr) atom, and
at least one alkoxide ligand or chelating ligand.

It may thus be chosen preferably from the group constituted by the heterometallic complexes whose chemical formula comprises at least one alkoxide ligand or chelating ligand and at least two different metal atoms M and M' chosen from the following pairs:
M is a magnesium atom (Mg) and M' is a titanium atom (Ti),
M is a magnesium atom (Mg) and M' is a zirconium atom (Zr),
M is an aluminum atom (Al) and M' is a titanium atom (Ti), or
M is an aluminum atom (Al) and M' is a zirconium atom (Zr).

It is chosen even more preferentially from the group constituted by the heterometallic complexes whose chemical formula comprises at least one alkoxide ligand or chelating ligand and at least two different metal atoms M and M' chosen from the following pairs:
M is an aluminum atom (Al) and M' is a titanium atom (Ti), or
M is an aluminum atom (Al) and M' is a zirconium atom (Zr).

Even more preferably, compound C according to the invention is chosen from the group constituted by the heterometallic complexes whose chemical formula comprises at least one alkoxide ligand or chelating ligand and at least two metal atoms M and M', M being an aluminum atom (Al) and M' being a zirconium atom (Zr).

The mole ratio of the metal M to the metal M' may be between 0.1 and 10 and preferably between 0.25 and 4.

According to a very preferred embodiment, compound C according to the invention is chosen from the group constituted by:

the heterometallic complexes whose chemical formula comprises at least one alkoxide ligand or chelating ligand and at least two different metal atoms M and M', M being an aluminum atom and M' being a zirconium atom and in which the mole ratio Al/Zr is 1;

the heterometallic complexes whose chemical formula comprises at least one alkoxide ligand or chelating ligand and at least two different metal atoms M and M', M being an aluminum atom and M' being a zirconium atom and in which the mole ratio Al/Zr is 2;

the heterometallic complexes whose chemical formula comprises at least one alkoxide ligand or chelating ligand and at least two different metal atoms M and M', M being an aluminum atom and M' being a titanium atom and in which the mole ratio Al/Ti is 1;

the heterometallic complexes whose chemical formula comprises at least one alkoxide ligand or chelating ligand and at least two different metal atoms M and M', M being an aluminum atom and M' being a titanium atom and in which the mole ratio Al/Ti is 2;

the heterometallic complexes whose chemical formula comprises at least one alkoxide ligand or chelating ligand and at least two different metal atoms M and M', M being a magnesium atom and M' being a zirconium atom and in which the mole ratio Mg/Zr is 1;

the heterometallic complexes whose chemical formula comprises at least one alkoxide ligand or chelating ligand and at least two different metal atoms M and M', M being a magnesium atom and M' being a titanium atom and in which the mole ratio Mg/Ti is 1.

According to an even more preferred embodiment, compound C is chosen from the group constituted by:

the heterometallic complexes whose chemical formula comprises:
  at least two different metal atoms M and M', M being aluminum and M' being zirconium and in which the mole ratio Al/Zr=0.5, 1 or 2; and
  at least one alkoxide ligand or chelating ligand; and the heterometallic complexes whose chemical formula comprises:
  at least two different metal atoms M and M', M being aluminum and M' being titanium and in which the mole ratio Al/Ti=1 or 2, and
  at least one alkoxide ligand or chelating ligand.

One or more ligands complex the metal atoms. The heterometallic complex according to the invention comprises at least one ligand chosen from an alkoxide ligand or a chelating ligand.

The term "alkoxide ligand" denotes a ligand of chemical formula OR, R representing a $C_1$ to $C_{24}$ alkyl group. Preferably, the alkoxide ligand is a ligand of chemical formula OR, R representing a $C_2$ to $C_{12}$ alkyl group, and, more preferably, R is chosen from the group constituted by ethyl, isopropyl, n-propyl, n-butyl, sec-butyl, tert-butyl, isobutyl, 2-ethylhexyl and 2-butyloctyl.

The term "chelating ligand" denotes a ligand linked at least twice to one or more metal atoms. The chelating ligand may be chosen from bidentate, tridentate and tetradentate chelating ligands, preferably bidentate. A large number of chelating ligands are known to those skilled in the art.

In the text hereinbelow, the chelating ligands are described in their free and neutral form. When they are combined with a central element in a complex, it is possible for these chelating ligands to have lost a proton or to be in a tautomeric form.

Preferably, the chelating ligand is a ligand of general formula (I):

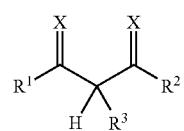

in which:
each X denotes, independently of each other, an oxygen atom or a group NR', R' representing a $C_1$ to $C_8$ alkyl group, optionally substituted one or more times with a halogen atom and/or with an aryl group;
$R^1$ and $R^2$, independently of each other, represent:
  a $C_1$ to $C_8$ alkyl or cycloalkyl group, optionally substituted one or more times with a halogen atom and/or with an aryl group,
  an aryl group, optionally substituted one or more times with a halogen atom,
  a $C_1$ to $C_8$ alkoxide group, optionally substituted one or more times with a halogen atom and/or with an aryl group,
  —OH,
  —$NR''_2$, each R" representing, independently of each other, a hydrogen atom or a $C_1$ to $C_8$ alkyl group, optionally substituted one or more times with a halogen atom and/or with an aryl group;
$R^3$ represents a monovalent group, preferably a hydrogen atom or a $C_1$ to $C_4$ alkyl group.

Preferably, the chelating ligand is chosen from the group constituted by a ligand of β-keto ester type, a ligand of β-diester type, a ligand of β-diketone type, a ligand of β-diacid type, a ligand of β-keto amide type and a ligand of β-diimide type.

Even more preferably, the chelating ligand is chosen from the group constituted by ethyl acetoacetate, ethyl ethyl acetate, ethyl propionyl acetate, ethyl 2-ethyl acetoacetate, ethyl trifluoroacetoacetate, ethyl t-butyl acetoacetate, ethyl cyclopropyl acetoacetate, propyl acetoacetonate, acetoacetone, hexafluoroacetylacetone, 4,4,4-trifluoro-1-phenyl-1,3-butanedione, 1,3-diphenyl-1,3-propanedione, 2,2,6,6-tetramethyl-3,5-heptanedione, diisopropyl malonate, acetoacetamide, bis-N,N'-(2-phenylethyl)-2,4-diiminopentane, methyl acrylate, 1,8-diazabicyclo(5.4.0)undec-7-ene and methyl pivaloyl acetate.

The heterometallic complex may comprise a single ligand or several ligands. The number and nature of the ligands is adapted to the coordination number of the metal atoms. When the heterometallic complex comprises only one ligand, it is chosen from an alkoxide ligand and a chelating ligand as defined above. When the heterometallic complex comprises several ligands, they may be identical or different. They may be, for example, several identical or different alkoxide ligands, several identical or different chelating ligands, or a mixture of alkoxide ligand(s) and of chelating ligand(s). In addition, other types of ligands may be present.

Most particularly, the heterometallic complex may comprise one or more oxo ligands (O), one or more hydroxyl ligands (OH) and/or one or more alcohol ligands. These ligands are liable to be present especially on account of the oligomerization and hydrolysis of the metal complexes bearing alkoxide ligands. The term "alcohol ligand" denotes a ligand of chemical formula ($C_1$ to $C_{24}$ alkyl)-OH.

Moreover, the heterometallic complex may comprise other neutral ligands. In the present invention, the term "neutral ligand" denotes a ligand which coordinates the metal by providing an electron pair thereto. A person skilled in the art will use any type of neutral ligand that is suitable for the metal concerned. The neutral ligand may be chosen from neutral ligands bearing at least one free electron pair such as amines, phosphines, ethers and water, ligands which coordinate via one or more π bonds such as ethylene, and ligands which coordinate via a G bond such as $H_2$. Preferably, the heterometallic complex according to the invention does not comprise any other neutral ligand.

Compound C according to the invention may be a heterometallic complex of general formula (II):

  (II)

in which:
the symbol M represents a magnesium Mg or aluminum Al atom;
the symbol M' represents a titanium Ti or zirconium Zr atom;
the symbol Lig1 represents an alkoxide ligand;
the symbol Lig2 represents a chelating ligand;
the symbol Lig3 represents a ligand chosen from the group constituted by: an oxo ligand, a hydroxide ligand, an alcohol ligand and a neutral ligand; and
m, n, x, y and z are numbers such that m>0, n>0, x≥0, y≥0, z≥0 and (x+y)>0.

In the above notation, the numbers m, n, x, y and z may be integer or non-integer numbers. When they are non-integer numbers, a person skilled in the art will understand that formula (II) is a general formula based on the composition of the complex and on the mole ratios between the various atoms or atomic groups. Furthermore, it is understood in this formula that if x is other than zero, then one or more identical or different ligands Lig1 may be present, if y is other than zero, then one or more identical or different ligands Lig2 may be present, and if z is other than zero, then one or more identical or different ligands Lig3 may be present.

The numbers m and n may be chosen independently between 0 and 20, zero being excluded, and the ratio m/n may be between 0.1 and 10. Preferably, m and n may independently be equal to 1, 2, 3 or 4. In addition, the ratio m/n is preferably between 0.25 and 4.

Compound C according to the invention may especially be chosen from the group constituted by the heterometallic complexes of formulae (IIa) to (IIf):

  (IIa)

  (IIb)

  (IIc)

  (IId)

  (IIe)

  (IIf)

in which Lig1, Lig2, Lig3, x, y and z are as defined above.

The heterometallic complex according to the invention comprises at least one alkoxide ligand Lig1 or a chelating ligand Lig2. In the general formula (II), x, y and z are integers such that x≥0, y≥0, z≥0 and (x+y)>0. x and y therefore cannot simultaneously be equal to zero. x may preferably be between 0 and 20 and more preferably between 0.1 and 12. y may preferably be between 0 and 20 and more preferably between 2 and 10. z may preferably be between 0 and 2. Lig1 is an alkoxide ligand preferably as described above, Lig2 is a chelating ligand preferably as described above and Lig3 is a neutral ligand preferably as described above.

Two particularly preferred embodiments are presented below.

According to a first particularly preferred embodiment of the present invention, compound C is a heterometallic alkoxide complex whose chemical formula comprises at least two different metal atoms M and M', M being a magnesium or aluminum atom and M' being a titanium or zirconium atom. This complex comprises at least one alkoxide ligand as defined above.

The ligands of this complex may be solely identical or different alkoxides, optionally as a mixture with one or more ligands chosen from the group constituted by an oxo ligand, a hydroxide ligand and an alcohol ligand.

Compound C according to this embodiment may be a heterometallic complex of general formula (II) in which "y" is zero and "x" is other than zero. It is preferably a heterometallic alkoxide complex of general formula (III):

  (III)

in which:
the symbol M represents a magnesium Mg or aluminum Al atom;
the symbol M' represents a titanium Ti or zirconium Zr atom;
the symbol Lig1 represents an alkoxide ligand;
the symbol Lig3 represents a ligand chosen from the group constituted by an oxo ligand, a hydroxide ligand and an alcohol ligand;
m, n, x, y and z are numbers such that m>0, n>0, x>0 and z≥0.

In particular, compound C is a heterometallic alkoxide complex whose chemical formula comprises:
at least two different metal atoms M and M', M being magnesium or aluminum and M' being titanium or zirconium, and
at least one alkoxide ligand;
and, preferably, said heterometallic alkoxide complex is chosen from the group constituted by:
heterometallic alkoxide complexes whose chemical formula comprises:
  at least two different metal atoms M and M', M being aluminum and M' being zirconium,
  at least one alkoxide ligand of chemical formula O-(linear or branched $C_3$ to $C_{12}$ alkyl), and
  in which the mole ratio Al/Zr is equal to 0.5, 1 or 2;
the heterometallic alkoxide complexes whose chemical formula comprises:
  at least two different metal atoms M and M', M being magnesium and M' being zirconium,
  at least one alkoxide ligand of chemical formula O-(linear or branched $C_2$ to $C_{12}$ alkyl), and
  in which the mole ratio Mg/Zr is equal to 0.5, 1, 2, 3 or 4; and
the heterometallic alkoxide complexes whose chemical formula comprises:
  at least two different metal atoms M and M', M being aluminum and M' being titanium,
  at least one alkoxide ligand of chemical formula O-(linear or branched $C_3$ to $C_{12}$ alkyl), and in which the mole ratio Al/Ti is equal to 1 or 2;
and even more preferably, said heterometallic alkoxide complex is chosen from the group constituted by AlZr(OBu)$_4$ (OsBu)$_3$, Al$_2$Zr(OnBu)$_4$(OsBu)$_6$, AlZr$_2$(OnBu)$_{11}$, AlTi(OsBu)$_3$(OnBu)$_4$ and Al$_2$Ti(OnBu)$_{10}$.

Certain heterometallic alkoxide complexes according to this embodiment are commercially available. For example, the company Gelest provides aluminum-titanium, aluminum-zirconium and magnesium-zirconium heterometallic alkoxide complexes.

Furthermore, the heterometallic alkoxide complexes according to this embodiment may be prepared from the corresponding monometallic alkoxides. A possible synthetic route consists in reacting the monometallic alkoxides together with stirring, preferably without solvent and preferably at room temperature, for a time that is sufficient for the combination reaction to take place. Generally, this reaction is exothermic.

The desired heterometallic alkoxide complexes may be obtained conventionally by ligand exchange. Alkoxide ligand exchange may conventionally be performed by reacting a first complex with the alcohol corresponding to the desired alkoxide ligand, this alcohol being less volatile than the alcohol corresponding to the ligand of the first complex, optionally in a suitable solvent, with heating and preferably under reduced pressure.

According to a second particularly preferred embodiment of the present invention, compound C is a heterometallic chelated complex whose chemical formula comprises at least two different metal atoms M and M', M being a magnesium or aluminum atom and M' being a titanium or zirconium atom. This complex comprises at least one chelating ligand as defined above.

The ligands of this complex may be solely identical or different chelates, or alternatively one or more chelates as a mixture with one or more ligands chosen from the group constituted by an alkoxide ligand, an oxo ligand, a hydroxide ligand and an alcohol ligand.

Compound C according to this embodiment may be a heterometallic complex of general formula (II) in which "y" is other than zero. It is preferably a heterometallic chelated complex of general formula (IV):

$$[M_mM'_n(Lig1)_x(Lig2)_y(Lig3)_z] \quad (IV)$$

in which:
the symbol M represents a magnesium Mg or aluminum Al atom;
the symbol M' represents a titanium Ti or zirconium Zr atom;
the symbol Lig1 represents an alkoxide ligand;
the symbol Lig2 represents a chelating ligand;
the symbol Lig3 represents a ligand chosen from the group constituted by an oxo ligand, a hydroxide ligand and an alcohol ligand;
m, n, x, y and z are numbers such that m>0, n>0, x≥0, y>0 and z≥0.

In particular, compound C is a heterometallic chelated complex whose chemical formula comprises:
at least two different metal atoms M and M', M being magnesium or aluminum and M' being titanium or zirconium, and
at least one chelating ligand;
said heterometallic chelated complex preferably being chosen from the group constituted by:
the heterometallic chelated complexes whose chemical formula comprises:

at least two different metal atoms M and M', M being aluminum and M' being zirconium,
at least one chelating ligand, preferably chosen from the group constituted by ethyl acetoacetate, propyl acetoacetate and diisopropyl malonate,
optionally at least one alkoxide ligand of chemical formula O-(linear or branched C$_3$ or C$_4$ alkyl), and
having a mole ratio Al/Zr=1 or 2;
the heterometallic chelated complexes whose chemical formula comprises:
at least two different metal atoms M and M', M being aluminum and M' being zirconium,
at least one chelating ligand, preferably chosen from the group constituted by ethyl acetoacetate, propyl acetoacetate and diisopropyl malonate,
having a mole ratio Al/Zr=1 or 2; and
not comprising any alkoxide ligand;
the heterometallic chelated complexes whose chemical formula comprises:
at least two different metal atoms M and M', M being magnesium and M' being zirconium,
at least one chelating ligand, preferably ethyl acetoacetate, and
having a mole ratio Mg/Zr=1;
the heterometallic chelated complexes whose chemical formula comprises:
at least two different metal atoms M and M', M being aluminum and M' being titanium,
at least one chelating ligand, preferably chosen from the group constituted by ethyl acetoacetate and propyl acetoacetate,
optionally at least one alkoxide ligand of chemical formula O-(linear or branched C$_3$ or C$_4$ alkyl), and
having a mole ratio Al/Ti=1; and
the heterometallic chelated complexes whose chemical formula comprises:
at least two different metal atoms M and M', M being magnesium and M' being titanium,
at least one chelating ligand, preferably ethyl acetoacetate,
optionally at least one alkoxide ligand of chemical formula O-(linear or branched C$_3$ alkyl), and
having a mole ratio Mg/Ti=1;
and even more preferably said heterometallic chelated complex being chosen from the group constituted by AlZr(EAA)$_3$ (OnPr)$_4$, Al$_2$Zr(EAA)$_6$(OnPr)$_4$, AlZr(EAA)$_7$, Al$_2$Zr(EAA)$_{10}$ and AlTi(EAA)$_3$(OnBu)$_4$.

Certain monometallic chelated complexes are commercially available. For example, the company DuPont proposes titanium or zirconium chelated complexes under the name Tyzor®.

Other monometallic chelated complexes bearing desired ligands may be obtained conventionally by ligand exchange. Ligand exchange may conventionally be performed by reacting a first complex with the precursor corresponding to the desired ligand, optionally in a suitable solvent, with heating and preferably under reduced pressure.

The synthesis of the heterometallic chelated complexes may be performed according to three methods:
via a Lewis acid-base reaction by placing in contact one or more alkoxide complexes and/or monometallic chelates, preferably at room temperature and without solvent, for a time sufficient for the combination reaction to take place, for example according to the following reaction scheme:

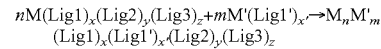

$$nM(Lig1)_x(Lig2)_y(Lig3)_z + mM'(Lig1')_{x'} \rightarrow M_nM'_m(Lig1)_x(Lig1')_{x'}(Lig2)_y(Lig3)_z$$

in which M, M', Lig1, Lig2, Lig3, n, m, x, y and z have the meanings given above, Lig1' represents the alkoxide ligand that is identical or different to Lig1, x' is a number such that x'>0;

by substitution of one or more alkoxide ligands on a heterometallic alkoxide complex with a chelating ligand, for example according to the following reaction scheme:

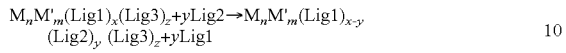

in which M, M', Lig1, Lig2, Lig3, n, m, x, y and z have the meanings given above;

by synthesis in two steps:
a) synthesis of a monometallic chelated complex starting with a monometallic alkoxide complex by ligand exchange with a chelate, for example according to the following reaction scheme:

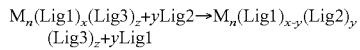

b) followed by combination of the monometallic chelated complex with a monometallic alkoxide complex based on a different metal, for example according to the following reaction scheme:

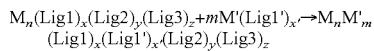

This two-step synthetic route may advantageously be a one-pot synthesis, without isolation of the intermediate products.

The inventors have discovered, entirely unexpectedly, that the heterometallic complexes according to the invention were better catalysts for the condensation reaction of condensable or hydrolyzable and condensable groups of a polyorganosiloxane, and in particular the polycondensation reaction of silicones, than simple mixing of the corresponding monometallic complexes.

Compound C as catalyst is present in the curable composition in the presence of water or atmospheric moisture according to the invention in catalytic amount. The concentration of catalyst in the composition according to the invention may be between 0.1% and 6%, preferably between 1% and 3%, by weight relative to the total weight of the composition.

The catalyst according to the invention may be in the solid or liquid state. It may be incorporated alone or in a suitable solvent. When it is in solvent, a silicone oil or any other compatible solvent such as petroleum fractions may be added, and the solvent is then evaporated so as to transfer the catalyst into a silicone medium. The mixture obtained may then serve as a "catalyzing base".

According to a particular embodiment, the invention relates to an article comprising:
a) a support (1),
b) at least one primer coat (2) deposited on said support (1) comprising at least one anticorrosion product,
c) at least one adhesion-promoting coat (3) deposited on said primer coat (2), and
d) at least one antifouling coat (4) deposited on said adhesion-promoting coat (3), said article being characterized in that said antifouling coat (4) is obtained after deposition and curing on contact with atmospheric moisture of a composition X comprising:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst C according to the invention, which is a heterometallic complex whose chemical formula comprises:
c) at least two different metal atoms M and M', M being an atom chosen from the group constituted by the atoms from columns 2 and 13 of the Periodic Table of the Elements and M' being an atom chosen from the group constituted by the atoms from column 4 of the Periodic Table of the Elements, and
d) at least one alkoxide ligand or chelating ligand.

According to another particular embodiment, the invention relates to an article according to the invention, characterized in that composition X comprises:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst C according to the invention, which is a heterometallic complex whose chemical formula comprises:
at least two different metal atoms M and M', M being a magnesium or aluminum atom and M' being a titanium or zirconium atom, and
at least one alkoxide ligand or chelating ligand.

According to two preferred embodiments, the polycondensation catalyst C is chosen from:
the group constituted by: AlZr(OBu)$_4$(OsBu)$_3$, Al$_2$Zr(OnBu)$_4$(OsBu)$_6$, AlZr$_2$(OnBu)$_{11}$, AlTi(OsBu)$_3$(OnBu)$_4$ and Al$_2$Ti(OnBu)$_{10}$, or
the group constituted by: AlZr(EAA)$_3$(OnPr)$_4$, Al$_2$Zr(EAA)$_3$(OnPr)$_4$, AlZr(EAA)$_7$, Al$_2$Zr(EAA)$_{10}$ and AlTi(EAA)$_3$(OnBu)$_4$.

The amount of polycondensation catalysts C according to the invention is between 0.01% and 10% by weight relative to the total mass of composition X, preferably between 0.1% and 5%, whether it is a one-pack or two-pack preparation.

Preferably, the organosilicon compound A' is a polyorganosiloxane comprising:
(i) at least two siloxyl units of formula (4') below:

in which:
the symbols R$^1$, which may be identical or different, represent C$_1$ to C$_{30}$ monovalent hydrocarbon-based radicals,
the symbols Z, which may be identical or different, each represent a hydrolyzable and condensable group or a hydroxyl group and are preferably chosen from the group constituted by groups of the following types: hydroxyl, alkoxy, alkoxy-alkylene-oxy, amino, amido, acylamino, aminoxy, iminoxy, ketiminoxy, acyloxy, iminoxy, ketiminoxy and enoxy and even more preferentially Z is a hydroxyl group,
a is equal to 0, 1 or 2, b is equal to 1, 2 or 3, the sum a+b is equal to 1, 2 or 3,
(ii) and optionally one or more siloxyl units of formula (5') below:

 (5')

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

Preferably, the organosilicon compound A' according to the invention will bear at least two groups chosen from the group constituted by groups of the following types: hydroxyl, alkoxy, alkoxy-alkylene-oxy, amino, amido, acylamino, aminoxy, iminoxy, ketiminoxy, acyloxy and enoxy.

Preferably, the organosilicon compound A' is a polyorganosiloxane of general formula (6'):

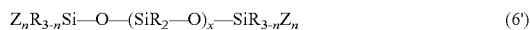 (6')

in which:
the symbols Z, which may be identical or different, each represent a hydrolyzable and condensable group or a hydroxyl group and are preferably chosen from the group constituted by groups of the following types: hydroxyl, alkoxy, alkoxy-alkylene-oxy, amino, amido, acylamino, aminoxy, iminoxy, ketiminoxy, acyloxy and enoxy,
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups,
the symbol n is equal to 1, 2 or 3, preferably equal to 2 or 3, and when Z is a hydroxyl group, then n=1,
the symbol x is between 200 and 10000, preferably between 200 and 1000 and even more preferentially between 250 and 600.

In formulae (4'), (5') and (6'), the symbols R' and R are preferably:
alkyl radicals containing from 1 to 20 carbon atoms optionally substituted with: one or more aryl or cycloalkyl groups, with one or more halogen atoms or with amino, ether, ester, epoxy, mercapto, cyano or (poly)glycol groups. Examples that may be mentioned include methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals,
cycloalkyl and halocycloalkyl radicals containing from 5 to 13 carbon atoms, such as cyclopentyl, cyclohexyl, methylcyclohexyl, propylcyclohexyl, 2,3-difluorocyclobutyl and 3,4-difluoro-5-methylcycloheptyl radicals,
mononuclear aryl and haloaryl radicals containing from 6 to 13 carbon atoms, such as phenyl, tolyl, xylyl, chlorophenyl, dichlorophenyl or trichlorophenyl radicals, or
alkenyl radicals containing from 2 to 8 carbon atoms, such as vinyl, allyl or 2-butenyl radicals.

The dynamic viscosity at 25° C. of the organosilicon compound A' is generally between 50 and 1 000 000 mPa·s and preferably between 50 and 100 000 mPa·s at 25° C.

In the particular case where the organosilicon compound A' is a polyorganosiloxane of general formula (6') with symbols Z of hydroxyl type, then the symbol n will preferably be equal to 1. In this case, it is preferred to use α-omega dihydroxy polyorganosiloxanes which are generally oils whose dynamic viscosity at 25° C. ranges, for example, between 500 mPa·s and 20 000 mPa·s.

When the organosilicon compound A' is a polyorganosiloxane, it is advantageous to use those of which at least 60% of the radicals R and $R^1$ (in formulae 4' and 5') or of the radical R (in formula 6') are methyl radicals, the other radicals generally being phenyl and/or vinyl radicals.

According to the invention, the symbols Z each represent a hydroxyl group or a hydrolyzable and condensable group which are preferably chosen from the group constituted by alkoxy, alkoxy-alkylene-oxy, amino, amido, acylamino, aminoxy, iminoxy, ketiminoxy, acyloxy and enoxy groups.

When the organosilicon compound A' contains hydrolyzable and condensable groups Z according to the invention and is a polyorganosiloxane, it is usually described as a functionalized polymer and corresponds to a form that is stable in the absence of moisture which may be used in a one-pack composition and may thus be packaged in a hermetically sealed jar, cartridge or drum, which will be opened by the operator during use for application to the support to be treated. When the organosilicon group A' contains groups Z of hydroxyl type, they may then be functionalized in situ in the one-pack compositions, via a functionalization catalyst such as lithium hydroxide, so as to be able to store them and package them in hermetically sealed cartridges.

As examples of hydrolyzable and condensable groups Z of alkoxy type, mention may be made of groups containing from 1 to 8 carbon atoms, such as methoxy, ethoxy, n-propoxy, isopropoxy, n-butoxy, isobutoxy, sec-butoxy, tert-butoxy, 2-methoxyethoxy, hexyloxy or octyloxy groups.

As an example of hydrolyzable and condensable groups Z of alkoxy-alkylene-oxy type, mention may be made of the methoxy-ethylene-oxy group.

As examples of hydrolyzable and condensable groups Z of amino type, mention may be made of methylamino, dimethylamino, ethylamino, diethylamino, n-butylamino, sec-butylamino or cyclohexylamino groups.

As an example of hydrolyzable and condensable groups Z of amido type, mention may be made of the N-methylacetamido group.

As an example of hydrolyzable and condensable groups Z of acylamino type, mention may be made of the benzoylamino group.

As examples of hydrolyzable and condensable groups Z of aminoxy type, mention may be made of dimethylaminoxy, diethylaminoxy, dioctylaminoxy or diphenylaminoxy groups.

As examples of hydrolyzable and condensable groups Z of iminoxy and in particular ketiminoxy type, mention may be made of groups derived from the following oximes: acetophenone oxime, acetone oxime, benzophenone oxime, methylethylketoxime, diisopropylketoxime or methylisobutylketoxime.

As an example of hydrolyzable and condensable groups Z of acyloxy type, mention may be made of the acetoxy group.

As an example of hydrolyzable and condensable groups Z of enoxy type, mention may be made of the 2-propenoxy group.

Preferably, the organosilicon compound A' is a polyorganosiloxane (7') having the following formula:

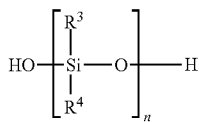
(7')

in which formula:
the symbol n is between 1 and 2000, preferably between 2 and 2000, more preferentially between 1 and 1000 and even more preferentially between 2 and 1000, $R^3$ and $R^4$, which may be identical or different, represent: an alkyl containing from 1 to 6 carbon atoms; a cycloalkyl containing from 3 to 8 carbon atoms; an aryl, an alkylarylene or an arylalkylene.

Examples of polyorganosiloxanes (7') that are the most useful, due to their industrial availability, are those for which $R^3$ and $R^4$ are chosen independently from the group of radicals constituted by a methyl, an ethyl, a propyl, an isopropyl, a cyclohexyl, a phenyl and a 3,3,3-trifluoropropyl. Very preferably, at least about 80% by number of these radicals are methyl radicals.

Even more preferably, the polyorganosiloxane (7') is a polyorganosiloxane of formula (8'):

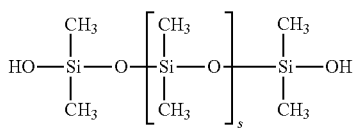
(8')

with $1 \leq s \leq 4200$ and preferably $2 \leq s \leq 1500$.

In the context of the present invention, use may be made especially of the α,ω-bis (dimethylhydroxysilyl)polydimethylsiloxanes prepared via the anionic polymerization process described in American patents U.S. Pat. No. 2,891,920 and U.S. Pat. No. 3,294,725.

According to a preferred embodiment, the crosslinking agent B' is a silicon compound, each molecule of which comprises at least three hydrolyzable and condensable groups Y and said crosslinking agent B' having the formula (9') below:

$$R'_{(4-a)}SiY_a \qquad (9')$$

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group and preferably Y is an alkoxy, acyloxy, enoxy, ketiminoxy or oxime group,
the symbol a=3 or 4.

Examples of groups Y are the same as those mentioned above when the symbol Z is a hydrolyzable and condensable group, i.e. other than a hydroxyl group.

As examples of crosslinking agent B', mention may be made of the alkoxysilanes of general formula (10') below, and the products of partial hydrolysis of this silane:

$$R^2_k Si(OR^3)_{(4-k)} \qquad (10')$$

in which:
the symbols $R^2$, which may be identical or different, represent alkyl radicals containing from 1 to 8 carbon atoms, such as methyl, ethyl, propyl, butyl, pentyl, 2-ethylhexyl radicals or $C_3$-$C_6$ oxyalkylene radicals, the symbol $R^3$ represents a saturated or unsaturated, linear or branched aliphatic hydrocarbon-based group, a saturated or unsaturated and/or aromatic, monocyclic or polycyclic carbocyclic group,
and k is equal to 0, 1 or 2.

As examples of $C_3$-$C_6$ alkoxyalkylene radicals, mention may be made of the following radicals:
$CH_3OCH_2CH_2$—
$CH_3OCH_2CH(CH_3)$—
$CH_3OCH(CH_3)CH_2$—
$C_2H_5OCH_2CH_2CH_2$—

The symbol $R^3$ preferably represents a $C_1$-$C_{10}$ hydrocarbon-based radical that encompasses:
$C_1$-$C_{10}$ alkyl radicals such as methyl, ethyl, propyl, butyl, pentyl, 2-ethylhexyl, octyl or decyl radicals,
vinyl and allyl radicals, and
$C_5$-$C_8$ cycloalkyl radicals such as phenyl, tolyl and xylyl radicals.

These crosslinking agents B' are products that are available on the silicones market; furthermore, their use in room-temperature curing compositions is known; it is featured especially in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents B', preference is more particularly given to alkyltrialkoxysilanes, alkyl silicates and polyalkyl silicates, in which the organic radicals are alkyl radicals containing from 1 to 4 carbon atoms.

As other examples of crosslinking agents B' that may be used, mention is more particularly made of poly ethyl silicate, poly(n-propyl silicate) and the following silanes: propyltrimethoxysilane, methyltrimethoxysilane, ethyltrimethoxysilane, vinyltriethoxysilane, vinyltrimethoxysilane, methyltriethoxysilane, propyltriethoxysilane, tetramethoxysilane, tetraethoxysilane, tetrapropoxysilane, tetrabutoxy silane, 1,2-bis(trimethoxysilyl)ethane, 1,2-bis (triethoxysilyl)ethane, tetraisopropoxysilane, phenyltriethoxysilane, methyltris(methylethylketoximo)silane, 3-cyanopropyltrimethoxysilane, 3-cyanopropyltriethoxysilane, 3-(glycidyloxy)propyltriethoxysilane, vinyltris(methylethylketoximo)silane, tetrakis(methylethylketoximo)silane, acyloxysilanes such as vinyltriacetoxysilane, methyltriacetoxysilane or ethyltriacetoxysilane or alternatively those having the following formulae:

$CH_3Si(OCH_3)_3$; $C_2H_5Si(OC_2H_5)_3$; $C_2H_5Si(OCH_3)_3$
$CH_2=CHSi(OCH_3)_3$; $CH_2=CHSi(OCH_2CH_2OCH_3)_3$
$C_6H_5Si(OCH_3)_3$; $[CH_3][OCH(CH_3)CH_2OCH_3]Si[OCH_3]_2$
$Si(OCH_3)_4$; $Si(OC_2H_5)_4$; $Si(OCH_2CH_2CH_3)_4$; $Si(OCH_2CH_2CH_2CH_3)_4$
$Si(OC_2H_4OCH_3)_4$; $CH_3Si(OC_2H_4OCH_3)_3$; $ClCH_2Si(OC_2H_5)_3$.

In general, from 0.1 to 60 parts by weight of crosslinking agent B' are used per 100 parts by weight of organosilicon compound A'. Preferably, from 1 to 15 parts by weight are used per 100 parts by weight of organosilicon compound A'.

According to a particularly advantageous embodiment, composition X comprises:
(i) at least one organosilicon compound A' comprising at least two identical or different hydrolyzable and condensable groups, or at least two silanol functions ≡SiOH,
(ii) at least one crosslinking agent B',
(iii) a catalytically effective amount of at least one polycondensation catalyst C as defined above, (iv) at least one compound L' which exudes at the surface of the antifouling coat when the elastomer network is formed, thus improving the "antifouling" effect,
(v) optionally at least one adhesion promoter E',
(vi) optionally at least one siliceous mineral, organic and/or non-siliceous filler F',
(vii) optionally at least one pigment, a coloring base or a coloring agent H', and
(viii) optionally at least one solvent K'.

Examples of compounds L' that exude at the surface of the antifouling coat when the elastomer network is formed, thus improving the "antifouling" effect, are, for example, compounds a), b), c), d), e), f) and g) below:

Compounds a) are polyorganosiloxane oils corresponding to general formula (II) below:

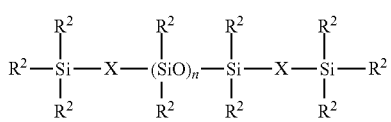

(II)

in which:
R² is an alkyl, aryl or alkenyl radical, methyl and phenyl radicals are preferred (a particularly preferred example being a methylphenylpolysiloxane oil as described, for example, in patent U.S. Pat. No. 4,025,693),
X is an oxygen atom or a divalent hydrocarbon-based group of 1 to 8 carbon atoms, and
n is a number defined so as to obtain a diorganopolysiloxane with a viscosity of between 10 and $1 \times 10^6$ mm²/s at 25° C.

These polyorganosiloxane oils may optionally be grafted and comprise acrylic, amide, amine, carbonyl, carboxylic, carboxylate, thiol, thioether, urea, quaternary ammonium, fluoroalkyl or perfluoroalkyl groups. Grafted or block polydimethylsiloxane oils comprising at least one polyether block (with, for example, polyethylene glycol and/or polypropylene glycol groups) may also be used.

Compound b) is a hydrocarbon-based liquid compound: for example a polyolefin such as an ethylene/propylene copolymer and in particular a low molecular weight polyisobutene (up to 5000 g/mol and preferably between 300 and 500 g/mol).

Compound c) is an organic liquid compound chosen from polydienes, polyesters, polyisocyanates, polyurethanes, polyepoxides, fluoroalkyls, fluoro ethers, lubricant oils (see, for example, patent FR-A-2 375 305) and plasticizers (for example fatty acid esters that may be optionally substituted with heteroatoms or phosphoric acid esters or halohydrocarbon compounds). Polyethylene glycols, polypropylene glycols or castor oil may also be used and they also afford anti-running properties during the application of the composition.

The compounds d) are liquid paraffins and waxy masses such as petrolatum (JP-A-83/013 673).

Compound e) is a thermoplastic polymer such as PVC.

Compound f) is a vinyl chloride/vinyl acetate copolymer (Kokai JP-A-79/026 826).

The compounds g) are cationic, anionic, nonionic or amphoteric surfactants (JP-A-85/258 271).

As examples of adhesion promoters E', mention may be made, for example, of organosilicon compounds simultaneously bearing:

one or more hydrolyzable groups bonded to the silicon atom, and
one or more organic groups substituted with radicals comprising a nitrogen atom or chosen from the group of (meth)acrylate, epoxy and alkenyl radicals, and more preferentially still from the group constituted by the following compounds, taken alone or as a mixture:
vinyltrimethoxysilane (VTMO);
3-glycidoxypropyltrimethoxysilane (GLYMO);
methacryloxypropyltrimethoxysilane (MEMO);
[H₂N(CH₂)₃]Si(OCH₂CH₂CH₃)₃,

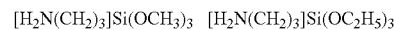

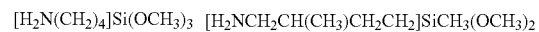

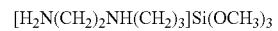

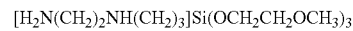

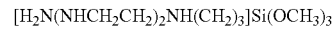

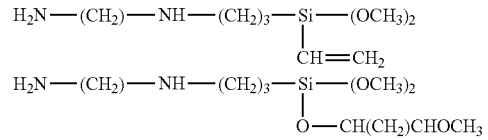

The adhesion promoter E may be present in the silicone composition according to the invention in an amount of between 0% and 20% by weight, preferably between 1% and 20% by weight, relative to the weight of the organosilicon compound A'.

As examples of siliceous, organic and/or non-siliceous mineral F', mention may be made of very finely divided products whose mean particle diameter is less than 0.1 μm. Among these fillers are fumed silicas and precipitated silicas; their BET specific surface area is generally greater than 40 m²/g. These fillers may also be in the form of more coarsely divided products with an average particle diameter greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g. These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may consist of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g. The purpose of introducing fillers is to give good mechanical and rheological properties to the elastomers that result from the curing of the compositions according to the invention.

The compositions according to the invention may also advantageously comprise at least one silicone resin (J'). These silicone resins are branched organopolysiloxane polymers which are well known and which are available commercially. They have, per molecule, at least two different units chosen from those of formulae $R'''_3SiO_{1/2}$ (M unit), $R'''_2SiO_{2/2}$ (D unit), $R'''SiO_{3/2}$ (T unit) and $SiO_{4/2}$ (Q unit) with at least one of the units being a T or Q unit. The radicals R''' are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as examples of alkyl radicals R, of: a methyl, an ethyl, an isopropyl, a tert-butyl and an n-hexyl. These resins are preferably hydroxylated and, in this case, have a weight content of hydroxyl group of between 5 and 500 meq./100 g. Examples of resins that may be mentioned include MQ resins, MDQ resins, TD resins and MDT resins.

Composition X according to the invention may also comprise a pigment, a coloring base or a coloring agent H'. Examples of pigments H' are, as a guide: red iron oxide, zinc oxide, carbon black, graphite, yellow iron oxide, white titanium oxide, chromium oxide, cobalt oxide, litharge, ultramarine and molybdenum red and yellow, or organic pigments that are known and widely used in the field of aquatic paints. Other common auxiliary agents and additives (thixotropic agents, anti-running agents, etc.) may be incorporated into the composition according to the invention.

Besides the main constituents, composition X may comprise nonreactive linear polyorganosiloxane polymers (G'), which may be introduced with the intention of acting on the physical characteristics of the compositions in accordance with the invention and/or on the mechanical properties of the elastomers resulting from the curing of these compositions.

These nonreactive linear polyorganosiloxane polymers (G') are well known; they more especially comprise: α,ω-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, may be introduced in a proportion of at most 70 parts by weight, preferably of 5 to 20 parts by weight, per 100 parts by weight of the organosilicon compound A'.

Examples of solvents K' are: aliphatic, cycloaliphatic or aromatic hydrocarbon-based derivatives such as white spirit, cyclohexane, toluene, octamethyltrisiloxane, xylene and ester solvents such as methoxypropyl acetate, n-butyl acetate and 2-ethoxyethyl acetate, acetone, acetonitrile, and also mixtures thereof. The amount of solvent is determined according to the application or the support to be treated so as to obtain a paint of acceptable viscosity.

Other customary auxiliary agents and additives may be incorporated into the composition according to the invention; these are chosen as a function of the applications in which said compositions are used.

The compositions according to the invention may be:
one-pack or RTV-1, i.e. packaged in a single airtight packaging, and stable on storage in the absence of moisture, or
two-pack or RTV-2, i.e. packaged in two packagings and the components of the composition are separated into two separate fractions, which cure once they are combined in the presence of atmospheric moisture.

One-pack bases are described in detail, for example, in patents EP 141 685, EP 147 323, EP 102 268, EP 21 859, FR 2 121 289 and FR 2 121 631, cited as reference.

Two-pack bases are described in detail, for example, in patents EP 118 325, EP 117 772, EP 10 478, EP 50 358, EP 184 966, U.S. Pat. No. 3,801,572 and U.S. Pat. No. 3,888, 815 cited as reference.

An RTV-2 two-pack composition, which is a precursor of composition X according to the invention, may be in two separate airtight packagings P1 and P2, characterized in that:
the packaging P1 comprises:
a catalytically effective amount of at least one polycondensation catalyst M' according to the invention and as defined above, and
at least one crosslinking agent B' and preferably as defined above, and
the packaging P2 does not contain said polycondensation catalyst C and said crosslinking agent B' and comprises:
per 100 parts by weight of at least one organosilicon compound A' which is preferably an α,ω-dihydroxylated polydimethylsiloxane whose viscosity is between 500 mPa·s and 100 000 mPa·s and preferably between 1000 mPa·s and 10 000 mPa·s, and
from 0 to 10 part(s) by weight of water.

One of the advantages of these novel RTV-2 compositions according to the invention over conventional polycondensation RTV-2 products using dialkyltin dicarboxylate catalysts is that it is no longer necessary to add water to the part P2 since the catalyst according to the invention does not need to be activated, thus simplifying the formulation.

Any material that is used in an aquatic environment and that is subject to fouling may be a support (1) for the present invention. Possible supports are boat construction materials, such as steel, aluminum, wood, resin-impregnated glass fibers and any other composite material. Materials used for pipes, such as concrete, plastics, steel, iron and other metals, may also be coated. Tanks containing water, including swimming pools, are subject to fouling. The materials used for manufacturing tanks are identical or similar to those used for manufacturing pipes.

When an antifouling coat (4) (or top coat) according to the invention is used, it may be combined with an adhesion-promoting coat (3) (or tie coat) of diverse and varied nature. For example, it may be made of polyurethane, of optionally chlorinated natural or synthetic rubber, such as chloroprene and neoprene, or of butyral/silicone rubber (Kokai JP-A-78/ 137 231, JP-A-78/137 233 and JP-A-78/137 234). According to another approach, for example described in U.S. Pat. No. 5,449,553, a tie coat is described and is prepared from a composition that is curable in atmospheric moisture comprising a tin-based polycondensation catalyst, a crosslinking agent such as ethyl silicate and a copolymer derived from the product of reaction of a silylhydroxy-terminated organopolysiloxane with a polymerizable monomer such as a styrene or a conjugated diolefin, for instance 1,3-butadiene. According to another example described in patent EP-1 670 866, a tie coat is formed from a composition comprising:

(i) from 0 to 60% by wet weight of pigments and fillers; and (ii) the remainder being a binder-based phase comprising:
from 1% to 90% by wet weight of one or more polysiloxanes bearing amine functions,
from 1% to 90% by wet weight of one or more polysiloxanes bearing epoxy functions, and
from 0 to 20% by wet weight of an adhesion promoter chosen from the group constituted by polysiloxanes bearing hydroxyl functions, polysiloxanes bearing hydroxyalkyl functions and polysiloxanes bearing $C_1$-$C_4$ alkoxy functions.

The invention also relates to a process for applying an antifouling coat (4) to a support (1) intended to be used in aquatic applications, comprising the following steps:

a) at least one primer coat (2) comprising at least one anticorrosion product is optionally deposited on said support (1),
b) an adhesion-promoting coat (3) is deposited on said primer coat (2) or on said support (1) when the primer coat (2) is absent,
c) said adhesion-promoting coat (3) is cured,
d) an antifouling coat (4) is deposited on said adhesion-promoting coat (3), and
e) said antifouling coat (4) is cured on contact with atmospheric moisture, and
said process being characterized in that the antifouling coat (4) and optionally the adhesion-promoting coat (3) are prepared from composition X according to the invention and as defined above.

The thickness of the coats applied may vary and films from 12 to 1000 microns in thickness (on condition that the deposit is uniform) have given good results. The typical thickness of the various coats is about 50 µm for the primer, 150 µm for the tie coat and 150 µm for the top coat. Needless to say, a person skilled in the art will know how to adapt the thickness of the various coats as a function of the desired result.

The final subject of the invention concerns a use of composition X according to the invention and as defined above for forming, after curing on contact with atmospheric moisture, an antifouling coat (4) on an article so as to protect it against the adhesion of aquatic organisms.

Thus, composition X according to the invention may be used as a "fouling-release coating" paint, which, after curing by means of atmospheric moisture or by adding water, gives the surface of the treated support ultra-smooth properties, with low friction forces and low surface energies. It is these physical properties which prevent the fouling from adhering.

Other advantages and features of the present invention will appear on reading the following examples that are given by way of illustration and that are in no way limiting.

EXAMPLES

Notation

OsBu: sec-butoxide
OnBu: n-butoxide
OtBu: tert-butoxide
OBO: 2-butyloctoxide
$OC_4H_9$: butoxide (mixture of linear and branched compounds)
OEH: 2-ethylhexoxide
OEt: ethoxide
OiPr: isopropoxide
OnPr: n-propoxide
OPr2Me: 2-methyl-1-propan oxide
EAA: ethyl acetoacetate
EEA: ethyl ethyl acetate
EPA: ethyl propionyl acetate
E2EA: ethyl 2-ethylacetoacetate
F.EEA: ethyl trifluoroacetoacetate
t.EAA: t-butyl ethyl acetoacetate
C4EA: cyclopropyl ethyl acetoacetate
PrOH: propanol
PAA: propyl acetoacetonate
EPAA: ethyl propionyl acetoacetate
acac: acetylacetone
F.acac.F: hexafluoroacetylacetone
Ph.acac.F: 4,4,4-trifluoro-1-phenyl-1,3-butanedione
Ph.acac.Ph: 1,3-diphenyl-1,3-propanedione
t.acac: 2,2,6,6-tetramethyl-3,5-heptanedione
diPrm: diisopropyl malonate
Aamid: acetoacetamide
NacNac: bis-N,N'-(2-phenylethyl)-2,4-diiminopentane
MA: methyl acrylate
DBU: 1,8-diazabicyclo(5.4.0)undec-7-ene Example 1

Synthesis and Analysis of the Heterometallic Alkoxide Complex $AlTi(OsBu)_3(OnBu)_4$ The monometallic alkoxides $Al(OsBu)_3$ and $Ti(OnBu)_4$ were ordered from Sigma-Aldrich and were used immediately on reception.

$Al(OsBu)_3$ and $Ti(OnBu)_4$ were mixed in molar proportions of 1 mol per 1 mol and stirred for 2 hours at room temperature. The oil quantitatively obtained was then characterized by infrared.

The appearance of two very intense new bands at 1035.8 $cm^{-1}$ and 996.2 $cm^{-1}$ were observed in the spectrum of the heterometallic complex, which correspond to the vibrations of the C—O bonds in the Al—C—O—C—Ti sequence. The bands at 611.7 $cm^{-1}$ and at 515.2 $cm^{-1}$, which were also very intense, correspond to vibrations of the metal-O bonds in the Al—O—Ti sequence. The other bands of moderate or weak intensity correspond to the bands that are visible in the starting materials, but with different resonance frequencies. These modifications clearly show a new chemical environment around the Al and Ti metals, and thus the creation of a new chemical species.

Example 2

Synthesis of Heterometallic Alkoxide Complexes

A series of heterometallic alkoxide complexes was prepared according to the following method:

The monometallic alkoxides of aluminum $Al(OnBu)_3$, $Al(OsBu)_3$, $Al(OBO)_3$, $Al(OiPr)_3$, $Al(OEH)_3$, of magnesium $Mg(OEt)_2$, $Mg(OBO)_2$, of zirconium $Zr(OnBu)_4$, $Zr(OBO)_4$, $Zr(OnBu)_4$, $Zr(OnPr)_4$, $Zr(OEH)_4$, $Zr(OEt)_4$ and of titanium $Ti(OBO)_4$, $Ti(OnBu)_4$, $Ti(OiPr)_4$ and $Ti(OEH)_4$, come from Sigma-Aldrich and were used immediately on reception or concentrated under reduced pressure.

The monometallic alkoxide species selected as a function of the desired complex were mixed in the desired molar proportions and stirred for 2 hours at room temperature. An oil was quantitatively obtained.

The list of heterometallic complexes synthesized is given below. The general formulae indicated represent the composition of the complex and the mole ratios between the various atoms or atomic groups as they should be according to the composition of the reaction medium and assuming that the reactions are complete. A person skilled in the art will, of course, understand that the reaction products obtained may differ from these general formulae.

Aluminum-Zirconium Complexes:
AlZr(OnBu)$_7$
AlZr(OBO)$_7$
AlZr(OsBu)$_3$ (OnBu)$_4$
Al$_{0.1}$Zr(OsBu)$_{0.3}$(OnBu)$_4$
Al$_{0.2}$Zr(OsBu)$_{0.6}$(OnBu)$_4$
Al$_{0.3}$Zr(OsBu)$_{0.9}$(OnBu)$_4$
Al$_{0.4}$Zr(OsBu)$_{1.2}$(OnBu)$_4$
Al$_{0.5}$Zr(OsBu)$_{1.5}$(OnBu)$_4$
Al$_{0.6}$Zr(OsBu)$_{1.8}$(OnBu)$_4$
Al$_{0.7}$Zr(OsBu)$_{2.1}$ (OnBu)$_4$
Al$_{0.8}$Zr(OsBu)$_{2.4}$(OnBu)$_4$
Al$_{0.9}$Zr(OsBu)$_{2.7}$(OnBu)$_4$
Al$_{1.1}$Zr(OsBu)$_{3.3}$(OnBu)$_4$
Al$_{1.2}$Zr(OsBu)$_{3.6}$(OnBu)$_4$
Al$_{1.3}$Zr(OsBu)$_{3.9}$(OnBu)$_4$
Al$_{1.4}$Zr(OsBu)$_{4.2}$(OnBu)$_4$
Al$_{1.5}$Zr(OsBu)$_{4.5}$(OnBu)$_4$
Al$_{1.6}$Zr(OsBu)$_{4.8}$(OnBu)$_4$
Al$_{1.7}$Zr(OsBu)$_{5.1}$ (OnBu)$_4$
Al$_{1.8}$Zr(OsBu)$_{5.4}$(OnBu)$_4$
Al$_{1.9}$Zr(OsBu)$_{5.7}$(OnBu)$_4$
AlZr$_{0.1}$(OsBu)$_3$ (OnBu)$_{0.4}$
AlZr$_{0.2}$(OsBu)$_3$(OnBu)$_{0.8}$
AlZr$_{0.3}$ (OsBu)$_3$ (OnBu)$_{1.2}$
AlZr$_{0.4}$(OsBu)$_3$ (OnBu)$_{1.6}$
AlZr$_{0.5}$(OsBu)$_3$(OnBu)$_2$
AlZr$_{0.6}$(OsBu)$_3$(OnBu)$_{2.4}$
AlZr$_{0.7}$(OsBu)$_3$(OnBu)$_{2.8}$
AlZr$_{0.8}$(OsBu)$_3$(OnBu)$_{3.2}$
AlZr$_{0.9}$(OsBu)$_3$(OnBu)$_{3.6}$
Al$_2$Zr(OnPr)$_4$(OiPr)$_6$
Al$_2$Zr(OnBu)$_{10}$
Al$_2$Zr(OnBu)$_4$(OsBu)$_6$
Al$_2$Zr(OEH)$_{10}$
AlZr$_2$ (OnBu)$_{11}$ Magnesium-Zirconium Complexes:
MgZr(OEt)$_6$
MgZr(OBO)$_6$
Mg$_2$Zr(OEt)$_8$
Mg$_3$Zr(OEt)$_{10}$
Mg$_4$Zr(OEt)$_{12}$
MgZr$_2$(OEt)$_{11}$ Aluminum-Titanium Complexes:
AlTi(OBO)$_7$
AlTi(OsBu)$_3$(OnBu)$_4$
Al$_{0.1}$Ti(OsBu)$_{0.3}$(OnBu)$_4$
Al$_{0.2}$Ti(OsBu)$_{0.6}$(OnBu)$_4$
Al$_{0.3}$Ti(OsBu)$_{0.9}$(OnBu)$_4$
Al$_{0.4}$Ti(OsBu)$_{1.2}$ (OnBu)$_4$
Al$_{0.5}$Ti(OsBu)$_{1.5}$(OnBu)$_4$
Al$_{0.6}$Ti(OsBu)$_{1.8}$(OnBu)$_4$
Al$_{0.7}$Ti(OsBu)$_{2.1}$(OnBu)$_4$
Al$_{0.8}$Ti(OsBu)$_{2.4}$(OnBu)$_4$
Al$_{0.9}$Ti(OsBu)$_{2.7}$(OnBu)$_4$
Al$_{1.1}$Ti(OsBu)$_{3.3}$(OnBu)$_4$
Al$_{1.2}$Ti(OsBu)$_{3.6}$(OnBu)$_4$
Al$_{1.3}$ Ti(OsBu)$_{3.9}$(OnBu)$_4$
Al$_{1.4}$Ti(OsBu)$_{4.2}$ (OnBu)$_4$
Al$_{1.5}$Ti(OsBu)$_{4.5}$(OnBu)$_4$
Al$_{1.6}$Ti(OsBu)$_{4.8}$(OnBu)$_4$
Al$_{1.7}$ Ti(OsBu)$_{5.1}$(OnBu)$_4$
Al$_{1.8}$Ti(OsBu)$_{5.4}$(OnBu)$_4$
Al$_{1.9}$Ti(OsBu)$_{5.7}$ (OnBu)$_4$
AlTi$_{0.1}$ (OsBu)$_3$(OnBu)$_{0.4}$
AlTi$_{0.2}$(OsBu)$_3$(OnBu)$_{0.8}$
AlTi$_{0.3}$ (OsBu)$_3$ (OnBu)$_{1.2}$
AlTi$_{0.4}$(OsBu)$_3$ (OnBu)$_{1.6}$
AlTi$_{0.5}$(OsBu)$_3$(OnBu)$_{2.0}$
AlTi$_{0.6}$(OsBu)$_3$(OnBu)$_{2.4}$
AlTi$_{0.7}$(OsBu)$_3$(OnBu)$_{2.8}$
AlTi$_{0.8}$(OsBu)$_3$(OnBu)$_{3.2}$
AlTi$_{0.9}$(OsBu)$_3$(OnBu)$_{3.6}$
Al$_2$Ti(OiPr)$_{10}$
Al$_2$Ti(OnBu)$_{10}$
Al$_2$Ti(OEH)$_{10}$ Furthermore, the commercial complexes below were used:

Aluminum-zirconium complex: Al$_2$Zr(OC$_4$H$_9$)$_{10}$
Magnesium-zirconium complex: MgZr(OC$_4$H$_9$)$_6$
Aluminum-titanium complex: Al$_2$Ti(OC$_4$H$_9$)$_{10}$
Magnesium-titanium complex: MgTi(OC$_4$H$_9$)$_6$ Example 3

Synthesis of Heterometallic Chelated Complexes

The monometallic alkoxides Mg(OEt), Al(OiPr)$_3$, Al(OsBu)$_3$, Zr(OnPr)$_4$, Zr(OnBu)$_4$, Zr(OnBu)$_2$(acac)$_2$, Zr(acac)$_4$, Ti(OiPr)$_4$, Ti(OnBu)$_4$ and Ti(EAA)$_2$(OPr2Me)$_2$ come from Sigma-Aldrich and were used immediately on reception or concentrated under reduced pressure.

Monometallic chelated complexes Mg(EAA)$_2$, Al(OsBu)$_2$ (EAA)$_2$, Al(EAA)$_3$, Zr(OnPr)$_2$(EAA)$_2$, Zr(OnPr)$_2$ (EEA)$_2$, Al(OnPr)$_2$(EEA)$_2$, Al(OnPr)$_2$(EPA)$_2$, Zr(OnPr)$_2$(E2EA)$_2$, Zr(OnPr)$_2$(F.EEA)$_2$, Zr(OnPr)$_2$ (t.EAA)$_2$, Zr(OnPr)$_2$(C4EA)$_2$, Zr(OnPr)(EAA)$_3$, Zr(OnPr)(EPAA)$_3$, Zr(EAA)$_4$.PrOH, Zr(PAA)$_4$.PrOH, Zr(EPAA)$_4$.EPAA, Zr(OnPr)$_2$(acac)$_2$, Zr(OnPr)$_2$(F.acac.F)$_2$, Zr(OnPr)$_2$(Ph.acac.F)$_2$, Zr(OnPr)$_2$(Ph.acac.Ph)$_2$, Zr(OnPr)$_2$ (t.acac)$_2$, Zr(OnPr)$_2$(diPrm)$_2$, Zr(diPrm)$_4$, Zr(OnPr)$_2$ (Aamid)$_2$, Zr(OnPr)$_2$(NacNac)$_2$, Zr(OnPr)$_2$(MA)$_2$, Zr(OnPr)$_2$ (DBU)$_2$.PrOH and Ti(EAA)$_2$(OiPr)$_2$ were prepared according to the following method:

1 equivalent of the corresponding monometallic alkoxide complex was diluted in toluene. 1, 2, 3 or 4 equivalents of corresponding ligand were then added to the preceding mixture. The solution was then heated to 140° C. for subsequent distillation of the azeotropic mixture formed by the alcohol released and toluene. The residual solvent was evaporated off.

The heterometallic chelated complexes were prepared according to three synthetic routes.

—Route 1: Combination of a Monometallic Alkoxide Complex with a Monometallic Chelated Complex AlTi(EAA)$_3$(OnBu)$_4$ was prepared by mixing 1 mol of Al(EAA)$_3$ with 1 mol of Ti(OnBu)$_4$. The mixture was stirred for 2 hours at room temperature. When solubility difficulties persisted, the mixture was heated to 65° C.

The complexes AlZr(EAA)$_3$(OnPr)$_4$, AlZr(EAA)$_7$, AlZr$_{0.5}$(EAA)$_5$, Al$_2$Zr(EAA)$_{10}$, AlZr(OsBu)$_3$(OnPr)$_4$ (diPrm)$_2$, MgZr(EAA)$_6$ and MgTi(EAA)$_4$(OiPr)$_2$ were prepared in the same manner with the corresponding starting complexes in the corresponding proportions.

—Route 2: Ligand Exchange

AlZr(EAA)$_7$ was prepared from 4 g of AlZr(OnBu)$_7$ diluted in 15 mL of toluene. 7 equivalents of ethyl acetoacetonate were then added to the preceding mixture, which was heated to 130° C. The azeotropic mixture formed by the butanol released and toluene was then distilled off and the residual solvent was evaporated off.

—Route 3: One-Pot Synthesis

AlZr(EAA)$_3$(OnPr)$_4$, AlZr(EAA)$_3$(OnBu)$_4$, AlZr(OiPr)$_5$(PAA)$_2$, AlTi(EAA)$_3$(OnBu)$_4$ and AlTi(PAA)$_2$(OiPr)$_5$ and Al$_2$Zr(EAA)$_6$(OnPr)$_4$ were synthesized in a one-pot reaction. To do this, 2 or 3 equivalents of ethyl acetoacetonate or of propyl acetoacetonate were added to one equivalent of Zr(OnBu)$_4$, Ti(OnBu)$_4$ or Al(OiPr)$_3$. The mixture was immediately heated to 70° C. until a homogeneous mixture was obtained, which was concentrated under reduced pressure to release the n-butanol or the isopropanol. Next, one equivalent of Al(OiPr)$_3$, Zr(OnBu)$_4$, Ti(OnBu)$_4$ or Zr(OnPr)$_4$ was added directly and, after stirring for 2 hours at room temperature, the desired heterometallic complexes were obtained in the form of a pale yellow oil.

Example 4

Catalytic Properties of the Heterometallic Complexes

To test the catalytic properties of the metal complexes, slurry compositions were prepared. To do this, 3464 g of an α,ω-hydroxy-polydimethylsiloxane oil of viscosity 20 000 mPa·s were mixed with 120 g of vinyltrimethoxysilane (VTMO). 16 g of lithium hydroxide diluted to 0.4% by weight in methanol were then added to the mixture formed. After stirring for 5 minutes, 400 g of AE55 fumed silica were added. The mixture was concentrated under reduced pressure and then stored in a closed cartridge protected from moisture.

For each test, 25 g of this slurry and an amount of catalyst were mixed using a speed mixer (twice 20 seconds at 2000 rpm). The catalytic activity of each composition was then evaluated by taking several measurements under constant temperature and hygrometry conditions (23° C. at 50%):

The skin-forming time (SFT): time after which surface crosslinking is observed. This is done with a beechwood stick on a film 2 mm thick.

The hardness (Shore A): this reflects the formation of the three-dimensional network. It was measured on the one hand on a superposition of 3 beads 2 mm thick, and on the other hand on a single bead 6 mm thick, over increasing times (5 hours, 1 day and 7 days). On the bead 6 mm thick, two measurements were taken: ">" corresponds to the hardness on the upper part of the bead and "<" corresponds to the lower or confined part of the bead. "NC" means non-crosslinked, "NS" means non-strippable, "S" means strippable and "T" means tack. These letters were used when the hardness was less than 5.

The data not determined are noted "n.d.".

The tests were conducted on heterometallic catalysts according to the invention and on catalysts of the prior art:
dibutyltin dilaurate (DBTDL)
tetrabutoxytitanium Ti(OnBu)$_4$
tri(sec-butoxy)aluminum Al(OsBu)$_3$
tetrapropoxyzirconium Zr(OnPr)$_4$ The results for the catalysts of alkoxide type in equimolar amounts are presented in Table 1 below.

TABLE 1

Table 1:

|  | Catalysts | mmol/OH | wt % | TFP 2 mm | DSA 5 hours 3 × 2 mm | DSA 1 day | DSA 7 days 6 mm < | > |
|---|---|---|---|---|---|---|---|---|
| reference catalysts | DLDBE | 2.1 | 2.7% | 8 min | S | 26 | 33 | 30 |
|  | Ti(OnBu)$_4$ | 2.1 | 1.4% | 15 min | 20 | 29 | 30 | 25 |
|  | Al(OsBu)$_3$ | 2.1 | 1.0% | NC | NC | NC | NC | |
|  | Zr(OnPr)$_4$ | 2.1 | 1.4% | n.d. | NS | NS | 18 | 19 |
| Ex. 1 | AlZr(OsBu)$_3$(OBu)$_4$ | 2.1 | 2.6% | n.d. | 26 | 27 | 30 | 25 |
| Ex. 2 | Al$_{1.4}$Zr(OsBu)$_{4.2}$(OnBu)$_4$ | 2.1 | 2.9% | 5 min | 10 | 23 | 30 | 25 |
| Ex. 3 | Al$_2$Zr(OC$_4$H$_9$)$_{10}$ | 2.1 | 3.3% | 5 min | 19 | 29 | 29 | 24 |
| Ex. 4 | AlTi(OsBu)$_3$(OnBu)$_4$ | 2.1 | 2.5% | n.d. | 28 | 33 | 33 | 28 |
| Ex. 5 | Al$_{0.5}$Ti(OsBu)$_{1.5}$(OnBu)$_4$ | 2.1 | 1.9% | 8 min | 22 | 28 | 32 | 26 |
| Ex. 6 | Al$_2$Ti(OC$_4$H$_9$)$_{10}$ | 2.1 | 3.2% | 10 min | 25 | 28 | 31 | 26 |
| Ex. 7 | AlTi$_{0.2}$(OsBu)$_3$(OnBu)$_{0.8}$ | 2.1 | 1.3% | 8 min | 14 | 29 | 30 | 28 |

The results for the catalysts of mixed chelate type in equimolar amounts are presented in Table 2:

TABLE 2

|  | Catalysts | mmol/OH | wt % | TFP 2 mm | DSA 5 hours 3 × 2 mm | DSA 1 day | DSA 7 days 6 mm < | > |
|---|---|---|---|---|---|---|---|---|
| reference catalysts | DLDBE | 2.1 | 2.7% | 8 min | S | 26 | 33 | 30 |
|  | Ti(OnBu)$_4$ | 2.1 | 1.4% | 15 min | 20 | 29 | 30 | 25 |
|  | Al(OsBu)$_3$ | 2.1 | 1.0% | NC | NC | NC | NC | |
|  | Zr(OnPr)$_4$ | 2.1 | 1.4% | n.d. | NS | NS | 18 | 19 |
| Ex. 8 | AlZr(EAA)$_7$ | 2.1 | 4.3% | 6 min | 25 | 31 | 31 | 29 |
| Ex. 9 | AlZr(OsBu)$_3$(OnPr)$_4$(diPrm)$_2$ | 2.1 | 3.7% | 10 min | 16 | 29 | 30 | 26 |
| Ex. 10 | AlTi(OiPr)$_5$(PAA)$_2$ | 2.1 | 2.0% | 6 min | 26 | 26 | 32 | 24 |

The heterometallic complexes lead rapidly, in less than 15 minutes, to elastomers that are just as hard as those obtained with reference catalysts such as dibutyltin dilaurate (DBTDL) and tetrabutoxytitanium Ti(OnBu)$_4$.

Example 5

Monometallic/Heterometallic Complexes Comparison

The catalytic activity of the heterometallic complexes according to the invention was compared with the catalytic activity of mixtures of monometallic complexes.

To do this, slurries were prepared as described in Example 4, and then mixed on the one hand with a heterometallic complex according to the invention, and on the other hand with the corresponding in situ mixture of two monometallic complexes.

The results are presented in Table 3:

TABLE 3

| | Catalysts | mmol/ OH | wt % | TFP 2 mm | DSA 5 hours 3 × 2 mm | DSA 1 day | DSA 7 days 6 mm < > | |
|---|---|---|---|---|---|---|---|---|
| Ex. 11 | AlZr(OsBu)$_3$(OnBu)$_4$ | 1.6 | 2.0% | 8 min | 3 | 13 | 26 | 20 |
| comparative | Al(OsBu)$_3$ | 1.6 | 1.2% | 12 min | 5 | 7 | 20 | 15 |
| | Zr(OnBu)$_4$ | 1.6 | 0.8% | | | | | |
| Ex. 12 | AlTi(OsBu)$_3$(OnBu)$_4$ | 1.7 | 2.0% | 10 min | 17 | 27 | 31 | 25 |
| comparative | Al(OsBu)$_3$ | 1.7 | 1.2% | 7 min | 16 | 27 | 30 | 22 |
| | Ti(OnBu)$_4$ | 1.7 | 0.8% | | | | | |
| Ex. 13 | AlZr(EAA)$_3$(OnPr)$_4$ | 1.3 | 2.0% | 8 min | 14 | 27 | 32 | 27 |
| comparative | Al(EAA)$_3$ | 1.3 | 1.1% | 24 min | NS | NS | 17 | 15 |
| | Zr(OnPr)$_4$ | 1.3 | 0.9% | | | | | |
| Ex. 14 | AlTi(EAA)$_3$(OnBu)$_4$ | 1.3 | 2.0% | 7 min | 21 | 29 | 34 | 28 |
| comparative | Al(EAA)$_3$ | 1.3 | 1.1% | 20 min | 5 | 20 | 29 | 26 |
| | Ti(OnBu)$_4$ | 1.3 | 0.9% | | | | | |

Better reactivity is observed for the preformed heterometallic catalysts relative to the monometallic alkoxides added in situ during the test. It is thought that, during the in situ placing in contact of the complexes, no combination reaction of the complexes is possible since they are present in a highly dilute medium. The difference in hardness is also explained by the formation of novel species leading to new reactivity relative to the monometallic species. Thus, it is necessary to preform the heterometallic complex before adding it to the silicone composition.

It is moreover found that compositions containing a zirconium-based catalyst, especially Al—Zr complexes, remain translucent even after accelerated aging (2 mm films placed at 100° C. for 7 days).

It is also noted that the compositions containing a heterometallic chelated catalyst are more stable after accelerated aging (cartridges placed for 3 weeks at 50° C.) than those containing a heterometallic alkoxide catalyst.

Example 6

Behavior in the Presence of an Adhesion Promoter

Slurries were prepared as described in Example 4 with, in addition, 1% by weight of an amino silane (3-(2-aminoethylamino)propyldimethoxymethylsilane) used conventionally as adhesion promoter. These slurries were mixed with a catalyst and the catalytic activity of each composition was then evaluated as in Example 3.

The results for the tests of the alkoxide catalysts in the presence of adhesion promoter are presented in Table 4:

TABLE 4

| | Catalysts | mmol/ OH | wt % | TFP 2 mm | DSA 5 hours 3 × 2 mm | DSA 1 day | DSA 7 days 6 mm < > | |
|---|---|---|---|---|---|---|---|---|
| Reference | DLDBE | 0.7 | 0.9% | 5 min | 25 | 29 | 31 | 29 |
| catalysts | Ti(OnBu)$_4$ | 2.1 | 1.4% | 20 min | NC | NC | NC | |
| | Al(OsBu)$_3$ | 2.1 | 1.0% | 25 min | NC | NC | NC | |
| | Zr(OnPr)$_4$ | 2.1 | 1.4% | 20 min | NC | NC | NC | |
| Ex. 15 | AlZr(OsBu)$_3$(OnBu)$_4$ | 2.1 | 2.6% | n.d. | 8 | 9 | 13 | 28 |
| Comparative | Al(OsBu)$_3$ | 2.1 | 1.0% | 10 min | T | S | S | |
| | Zr(OnBu)$_4$ | 2.1 | 1.6% | | | | | |
| Ex. 16 | Al$_2$Zr(OC$_4$H$_9$)$_{10}$ | 2.1 | 3.3% | 25 min | n.d. | 26 | 32 | 28 |
| Ex. 17 | AlTi(OsBu)$_3$(OnBu)$_4$ | 2.1 | 2.4% | n.d. | T | 9 | C | 19 |
| Comparative | Al(OsBu)$_3$ | 2.1 | 1.4% | 6 min | T | 3 | 6 | 21 |
| | Ti(OnBu)$_4$ | 2.1 | 1.0% | | | | | |
| Ex. 18 | Al$_2$Ti(OEH)$_{10}$ | 2.1 | 5.9% | n.d. | n.d. | 22 | 36 | 31 |
| Comparative | Al(OEH)$_3$ | 4.2 | 3.5% | 20 min | T | T | T | |
| | Ti(OEH)$_4$ | 2.1 | 2.4% | | | | | |
| Ex. 19 | Al$_2$Ti(OC$_4$H$_9$)$_{10}$ | 2.1 | 3.2% | 20 min | n.d. | 19 | 31 | 31 |

The results for the tests of the mixed chelated catalysts in the presence of adhesion promoter are presented in Table 5:

TABLE 5

| | Catalysts | mmol/ OH | wt % | TFP 2 mm | DSA 5 hours 3 × 2 mm | DSA 1 day | DSA 7 days 6 mm < > | |
|---|---|---|---|---|---|---|---|---|
| reference catalysts | DLDBE | 0.7 | 0.9% | 5 min | 25 | 29 | 31 | 29 |
| | Ti(OiPr)$_2$(EAA)$_2$ | 1.8 | 1.5% | 20 min | S | 15c | 28 | 25 |
| | Al(EAA)$_3$ | 2.1 | 1.0% | 10 min | T | S | T | |
| Ex. 20 | AlZr(EAA)$_3$(OnPr)$_4$ | 1.3 | 2.0% | 5 min | T | S | 11 | 23 |
| Comparative | Al(EAA)$_3$ | 1.3 | 1.1% | 17 min | T | T | T | |
| | Zr(OnPr)$_4$ | 1.3 | 0.9% | | | | | |
| Ex. 21 | Al$_2$Zr(EAA)$_6$(OnPr)$_4$ | 1.3 | 3.0% | 12 min | n.d. | 17 | 30 | 30 |
| Ex. 22 | AlTi(EAA)$_3$(OnBu)$_4$ | 1.5 | 2.0% | 5 min | T | 2 | 16 | 23 |
| Comparative | Al(EAA)$_3$ | 1.5 | 1.1% | 18 min | T | S | S | |
| | Ti(OnBu)$_4$ | 1.5 | 0.9% | | | | | |

In the presence of the adhesion promoter, it is possible to perform the polycondensation with the tin catalyst (DLDBE). On the other hand, the presence of the amino silane totally inhibits the reactivity of the tin-free catalysts of the prior art.

The heterometallic complexes according to the invention, which do not contain any tin, have catalytic activity even in the presence of the adhesion promoter. It was found that the catalyzed reaction was faster when the Al/Zr or Al/Ti mole ratio was 2.

Example 7

Adhesion Tests

To perform qualitative adhesion tests, a bead of product prepared from the formulation described in Example 4 and from the test catalyst was deposited on glass, concrete (on the rough face) and anodized aluminum plates that were cleaned and brushed beforehand. After a crosslinking time of 7 days (at 23° C. and 50% RH), manual stripping was performed after having commenced detachment at the support/joint interface. The results are expressed as a function of the type of rupture of the bead of product:

AR: adhesive rupture (the bead detaches from the support);

AR+: rupture with an adhesive tendency, but requiring the application of a force to detach the bead;

AR++: rupture with an adhesive tendency, but requiring the application of a large force to detach the bead;

CR: rupture of cohesive type (the bead breaks on application of a very strong force, without becoming detached from the support, even partially); in this case, the adhesion to the support is optimal.

The results are presented in Table 6:

TABLE 6

| | | Adhesion to a support: | | |
|---|---|---|---|---|
| | Catalysts | Glass | Concrete | Aluminum |
| Reference catalysts | DLDBE | AR | AR | AR |
| | Zr(OnPr)$_4$ | CR | AR | CR |
| | Ti(OnBu)$_4$ | AR | AR+ | AR+ |
| | Ti(EAA)$_2$(OiPr)$_2$ | AR | CR | CR |
| Ex. 23 | AlZr(OsBu)$_3$ (OnBu)$_4$ | CR | AR | CR |
| Ex. 24 | AlTi(OsBu)$_3$ (OnBu)$_4$ | CR | AR | CR |
| Comparative | Al(OsBu)$_3$ + Ti(OnBu)$_4$ | CR | AR | AR+ |
| Ex. 25 | AlZr(EAA)$_3$(OnPr)$_4$ | CR | CR | CR |
| Ex. 26 | AlTi(EAA)$_3$(OnBu)$_4$ | CR | CR | CR |
| Comparative | Al(EAA)$_3$ + Ti(OnBu)$_4$ | AR+ | CR | AR++ |

The zirconium alkoxide makes it possible to obtain cohesive rupture on glass and aluminum and adhesive rupture on concrete. Only the titanium chelate reference catalyst allows adhesion to the three supports. Irrespective of the content of alkoxide catalysts, the catalysts based on aluminum and zirconium allow cohesive rupture on glass and aluminum and adhesive rupture on concrete. The catalysts comprising chelate groups make it possible to obtain cohesive rupture on the three supports. The adhesion is lost when the mixing of monometallic catalysts is performed during the formulation. The presence of the chelate group gives the elastomer adhesion to the supports. It is therefore not necessary to add an adhesion promoter as with the tin reference. Preformation of the catalyst is once again essential for an optimum result.

Example 8

Colorimetric Tests

To perform qualitative colorimetric tests, a film of product 2 mm thick was prepared from the preceding formulation and from the test catalyst. After a crosslinking time of 7 days (at 23° C. and 50% RH), the opacity and the yellow color of the film through a white sheet were evaluated qualitatively. The qualitative results are given as a function of the reference catalysts:

−− corresponds to transparent and colorless elastomers,
− corresponds to a film tending toward opaque,
+ corresponds to a slightly yellow film,
++ corresponds to a yellow film.

NH will be noted when the elastomer is not homogeneous, with the appearance of pieces of catalysts that are insoluble in the oil.

The results are presented in Table 7:

TABLE 7

| | Catalysts | Colorimetry | |
| --- | --- | --- | --- |
| | | Opacity | Yellow |
| Reference catalysts | DLDBE | -- | -- |
| | Zr(OnPr)$_4$ | - | -- |
| | Ti(OnBu)$_4$ | - | + |
| | Ti(EAA)$_2$(OiPr)$_2$ | -- | ++ |
| Ex. 27 | AlZr(OsBu)$_3$(OnBu)$_4$ | -- | -- |
| Comparative | Al(OsBu)$_3$ + Zr(OnBu)$_4$ | -- | -- |
| Ex. 28 | AlTi(OsBu)$_3$(OnBu)$_4$ | -- | + |
| Comparative | Al(OsBu)$_3$ + Ti(OnBu)$_4$ | -- | + |
| Ex. 29 | AlZr(EAA)$_3$(OnPr)$_4$ | -- | -- |
| Comparative | Al(EAA)$_3$ + Zr(OnBu)$_4$ | NH | NH and - |
| Ex. 30 | AlTi(EAA)$_3$(OnBu)$_4$ | - | ++ |
| Comparative | Al(EAA)$_3$ + Ti(OnBu)$_4$ | NH | NH and + |

The films containing titanium-based catalysts are slightly or even completely yellow. Those catalyzed with mixtures of monometallic species are not homogeneous. On the other hand, the elastomers based on aluminum and zirconium are entirely translucent.

Example 9

Preparation of an Antifouling Top Coat According to the Invention

A sanded and degreased steel metal plate is coated with an epoxy primer coat (prepared from SigmaShield 610® sold by the company Sigma Coatings) about 50 μm thick. After 72 hours of drying at room temperature, an adhesion-promoting tie coat (prepared from SigmaGlide 790® sold by the company Sigma Coatings) about 150 microns thick is applied. After 48 hours of drying at room temperature, a coat of about 150 μm of the top coat prepared using each formulation tested described in Example 4 is applied with the following catalysts:

| | |
| --- | --- |
| Ex. 1 | AlZr(OsBu)$_3$(OBu)$_4$ |
| Ex. 2 | Al$_{1.4}$Zr(OsBu)$_{4.2}$(OnBu)$_4$ |
| Ex. 3 | Al$_2$Zr(OC$_4$H$_9$)$_{10}$ |
| Ex. 4 | AlTi(OsBu)$_3$(OnBu)$_4$ |
| Ex. 5 | Al$_{0.5}$Ti(OsBu)$_{1.5}$(OnBu)$_4$ |
| Ex. 6 | Al$_2$Ti(OC$_4$H$_9$)$_{10}$ |
| Ex. 7 | AlTi$_{0.2}$(OsBu)$_3$(OnBu)$_{0.8}$ |

After drying for 48 hours at room temperature, the plate is immersed in a marine medium (in seawater) and is examined after 12 and 23 weeks of immersion.

After washing abundantly with water, the antifouling evaluation is 100 for all the formulations tested, which indicates the total absence of organisms on the coated plate.

A pretreated antifouling metal plate is coated with an epoxy primer coat and an adhesion-promoting tie coat (prepared from the products Sigmaglide 790 sold by the company Sigma Coatings) of 250 microns. After leaving the coating to cure at room temperature, the plate is immersed in seawater and is examined after 14 and 23 weeks of immersion.

After washing abundantly with water, the antifouling evaluation is 100, which indicates the total absence of organisms on the coated plate.

The invention claimed is:

1. An article with antifouling properties for use in aquatic applications, optionally marine applications, comprising:
    a) a support,
    b) at least one adhesion-promoting coat deposited on said support, and
    c) at least one antifouling coat deposited on said adhesion-promoting coat, wherein said antifouling coat is obtained after deposition and curing on contact with atmospheric moisture of a composition X comprising:
        (i) at least one organosilicon compound A' comprising at least two identical or different hydrolyzable and condensable groups, or at least two silanol functions ≡SiOH,
        (ii) at least one crosslinking agent B', and
        (iii) a catalytically effective amount of at least one polycondensation catalyst C which is a heterometallic complex whose chemical formula comprises:
            at least two different metal atoms M and M', M being an atom chosen from the group constituted by the atoms of columns 2 and 13 of the Periodic Table of the Elements and M' being an atom chosen from the group constituted by the atoms of column 4 of the Periodic Table of the Elements, and
            at least one alkoxide ligand or chelating ligand.

2. The article as claimed in claim 1, comprising:
    a) a support,
    b) at least one primer coat deposited on said support comprising at least one anticorrosion product,
    c) at least one adhesion-promoting coat deposited on said primer coat, and
    d) at least one antifouling coat deposited on said adhesion-promoting coat, wherein said antifouling coat is obtained after deposition and curing on contact with atmospheric moisture of a composition X comprising:
        (i) at least one organosilicon compound A' comprising at least two identical or different hydrolyzable and condensable groups, or at least two silanol functions SiOH,
        (ii) at least one crosslinking agent B', and
        (iii) a catalytically effective amount of at least one polycondensation catalyst C which is a heterometallic complex whose chemical formula comprises:
            at least two different metal atoms M and M', M being an atom chosen from the group constituted by the atoms of columns 2 and 13 of the Periodic Table of the Elements and M' being an atom chosen from the group constituted by the atoms of column 4 of the Periodic Table of the Elements, and
            at least one alkoxide ligand or chelating ligand.

3. The article as claimed in claim 1, wherein composition X comprises:
    (i) at least one organosilicon compound A' comprising at least two identical or different hydrolyzable and condensable groups, or at least two silanol functions SiOH,
    (ii) at least one crosslinking agent B', and
    (iii) a catalytically effective amount of at least one polycondensation catalyst C which is a heterometallic complex whose chemical formula comprises:
        at least two different metal atoms M and M', M being a magnesium or aluminum atom and M' being a titanium or zirconium atom, and
        at least one alkoxide ligand or chelating ligand.

4. The article as claimed in claim 1, wherein the polycondensation catalyst C is chosen from the group constituted by: AlZr(OnBu)$_4$(OsBu)$_3$, Al$_2$Zr(OnBu)$_4$(OsBu)$_6$, $AlZr_2(OnBu)_{11}$, $AlTi(OsBu)_3(OnBu)_4$ and $Al_2Ti(OnBu)_{10}$, wherein OsBu is equal to sec-butoxide and OnBu is equal to n-butoxide.

5. The article as claimed in claim 1, in which the polycondensation catalyst C is chosen from the group constituted by: $AlZr(EAA)_3(OnPr)_4$, $Al_2Zr(EAA)_3(OnPr)_4$, $AlZr(EAA)_7$, $Al_2Zr(EAA)_{10}$ and $AlTi(EAA)_3(OnBu)_4$, wherein EAA is equal to ethyl acetoacetate, OnPr is equal to n-propoxide, and OnBu is equal to n-butoxide.

6. The article as claimed in claim 1, in which the organosilicon compound A' is a polyorganosiloxane comprising:
  (i) at least two siloxyl units of formula (4') below:

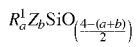  (4')

in which:
  the symbols $R^1$, which may be identical or different, represent $C_1$ to $C_{30}$ monovalent hydrocarbon-based radicals,
  the symbols Z, which may be identical or different, each represent a hydrolyzable and condensable group or a hydroxyl group and are optionally chosen from the group consisting of groups of the following types: hydroxyl, alkoxy, alkoxy-alkylene-oxy, amino, amido, acylamino, aminoxy, iminoxy, ketiminoxy, acyloxy, iminoxy, ketiminoxy and enoxy, optionally Z is a hydroxyl group,
  a is equal to 0, 1 or 2, b is equal to 1, 2 or 3, the sum a+b is equal to 1, 2 or 3,
  (ii) and optionally one or more siloxyl units of formula (5') below:

  (5')

in which:
  the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
  the symbol c is equal to 0, 1, 2 or 3.

7. The article as claimed in claim 1, in which the crosslinking agent B' is a silicon compound, each molecule of which comprises at least three hydrolyzable and condensable groups Y and said crosslinking agent B' having formula (9') below:

  (9')

in which formula:
  the symbol R' is a monovalent hydrocarbon-based radical comprising from 1 to 30 carbon atoms,
  the symbol Y is an alkoxy, alkoxy-alkylene-oxy, amino, amido, acylamino, aminoxy, iminoxy, ketiminoxy, acyloxy or enoxy group and preferably Y is an alkoxy group,
  the symbol a=3 or 4.

8. The article as claimed in claim 1, wherein composition X comprises:
  (i) at least one organosilicon compound A' comprising at least two identical or different hydrolyzable and condensable groups, or at least two silanol functions ≡SiOH,
  (ii) at least one crosslinking agent B',
  (iii) a catalytically effective amount of at least one polycondensation catalyst C,
  (iv) at least one compound L' which exudes at the surface of the antifouling coat when the elastomer network is formed, thus improving the "antifouling" effect,
  (v) optionally at least one adhesion promoter E',
  (vi) optionally at least one siliceous mineral, organic and/or non-siliceous filler F',
  (vii) optionally at least one pigment, a coloring base or a coloring agent H', and
  (viii) optionally at least one solvent K'.

9. A process for applying an antifouling coat to a support intended to be used in aquatic applications, comprising:
  a) at least one primer coat comprising at least one anti-corrosion product is optionally deposited on said support,
  b) an adhesion-promoting coat is deposited on said primer coat or on said support (1) when the primer coat is absent,
  c) said adhesion-promoting coat is cured,
  d) an antifouling coat is deposited on said adhesion-promoting coat, and
  e) said antifouling coat is cured on contact with atmospheric moisture,
    wherein the antifouling coat and optionally the adhesion-promoting coat are prepared from composition X comprising
      (i) at least one organosilicon compound A' comprising at least two identical or different hydrolyzable and condensable groups, or at least two silanol functions SiOH,
      (ii) at least one crosslinking agent B', and
      (iii) a catalytically effective amount of at least one polycondensation catalyst C which is a heterometallic complex whose chemical formula comprises:
        at least two different metal atoms M and M', M being an atom chosen from the group constituted by the atoms of columns 2 and 13 of the Periodic Table of the Elements and M' being an atom chosen from the group constituted by the atoms of column 4 of the Periodic Table of the Elements, and
        at least one alkoxide ligand or chelating ligand.

10. Composition X comprising
  (i) at least one organosilicon compound A' comprising at least two identical or different hydrolyzable and condensable groups, or at least two silanol functions ≡SiOH,
  (ii) at least one crosslinking agent B', and
  (iii) a catalytically effective amount of at least one polycondensation catalyst C which is a heterometallic complex whose chemical formula comprises:
    at least two different metal atoms M and M', M being an atom chosen from the group constituted by the atoms of columns 2 and 13 of the Periodic Table of the Elements and M' being an atom chosen from the group constituted by the atoms of column 4 of the Periodic Table of the Elements, and
    at least one alkoxide ligand or chelating ligand, for forming, after curing on contact with atmospheric moisture, an antifouling coat on an article so as to protect said article against adhesion of one or more aquatic organisms.

* * * * *